(12) United States Patent
Karunasiri et al.

(10) Patent No.: US 6,184,656 B1
(45) Date of Patent: *Feb. 6, 2001

(54) RADIO FREQUENCY ENERGY MANAGEMENT SYSTEM

(75) Inventors: Tissa R. Karunasiri, Van Nuys; David A. Bell, Altadena; Chetan Kumar Maini, Glendale; Bruce M. Ryan, West Hills, all of CA (US)

(73) Assignee: Aevt, Inc., Irwindale, CA (US)

(*) Notice: Under 35 U.S.C. 154(b), the term of this patent shall be extended for 0 days.

This patent is subject to a terminal disclaimer.

(21) Appl. No.: 09/353,946

(22) Filed: Jul. 15, 1999

Related U.S. Application Data

(63) Continuation of application No. 08/997,207, filed on Dec. 23, 1997, now abandoned, which is a continuation-in-part of application No. 08/495,984, filed on Jun. 28, 1995, now Pat. No. 5,703,464.

(51) Int. Cl.[7] ............................. H02V 7/00; B60K 1/00; H02K 5/24; G01S 13/74

(52) U.S. Cl. ..................... 320/119; 320/122; 180/65.8; 310/51; 342/442

(58) Field of Search ........................... 320/116, 119, 320/122, 134, 136; 180/65.8; 310/51; 340/510.01; 342/442

(56) References Cited

U.S. PATENT DOCUMENTS

| | | | |
|---|---|---|---|
| 3,617,850 | * 11/1971 | Domsby | 320/150 |
| 4,728,958 | * 3/1988 | Choate | 342/424 |
| 4,833,459 | 5/1989 | Geuer et al. | |
| 5,003,456 | 3/1991 | Forge | |
| 5,150,031 | 9/1992 | James et al. | |
| 5,195,813 | 3/1993 | Brown | |

(List continued on next page.)

FOREIGN PATENT DOCUMENTS

| | | |
|---|---|---|
| 34 11 234 C1 | 9/1985 | (DE) |
| 44 42 825 A1 | 6/1995 | (DE) |

(List continued on next page.)

OTHER PUBLICATIONS

Nor. et al., Very Fast Battery Charging and Battery Energy Management, published May 12, 1994, pp. 117–125.

*Primary Examiner*—Peter S. Wong
*Assistant Examiner*—Gregory J. Toatley, Jr.
(74) *Attorney, Agent, or Firm*—Knobbe, Martens, Olson & Bear LLP

(57) ABSTRACT

A radio frequency energy management system includes a number of battery control modules and/or a control unit that are configured to exchange battery operating parameter/performance information and control signals by radio frequency. Each battery control module includes one or more sensing elements to measure one or more operating parameter of a respective battery, and at least one device selected from the group including a radio frequency receiver, a radio frequency transmitter, a memory device, a controller, control devices, a signal blocking device, and combinations thereof. The control unit is configured to monitor and control the operating parameters of the batteries and includes a radio frequency receiver and a radio frequency transmitter. The control unit evaluates data transmitted from battery control modules according to a predetermined control system program, and transmits a predetermined control command to one or more battery control modules to achieve battery equalization and battery thermal management. The energy management system can also include one or more device for identifying the relative location of a battery control module in the system, and an interface to permit communication with battery control modules by another device independent of the control unit. Radio frequency signals are transmitted between the control unit and each battery control module, and between battery control modules, without additional wiring, thereby eliminating the disadvantages of wired-type systems.

34 Claims, 15 Drawing Sheets

U.S. PATENT DOCUMENTS

| | | |
|---|---|---|
| 5,200,688 | 4/1993 | Patino et al. . |
| 5,206,097 | 4/1993 | Burns et al. . |
| 5,248,929 | 9/1993 | Burke . |
| 5,302,902 | 4/1994 | Groehl . |
| 5,309,052 | 5/1994 | Kim . |
| 5,319,298 | 6/1994 | Wanzong et al. . |
| 5,325,040 | 6/1994 | Bogut et al. . |
| 5,341,083 | 8/1994 | Klontz et al. . |
| 5,349,282 | 9/1994 | McClure . |
| 5,349,535 | 9/1994 | Gupta . |
| 5,363,031 | 11/1994 | Miller et al. . |
| 5,376,922 | 12/1994 | Kiss . |
| 5,382,948 | 1/1995 | Richmond . |
| 5,387,857 | 2/1995 | Honda et al. . |
| 5,469,042 | 11/1995 | Rühling . |
| 5,475,366 | 12/1995 | Van Lente et al. . |
| 5,481,257 | 1/1996 | Brubaker et al. . |
| 5,488,282 | 1/1996 | Hayden et al. . |
| 5,534,845 | 7/1996 | Issa et al. . |
| 5,539,297 | 7/1996 | Fiebig . |
| 5,619,417 | 4/1997 | Kendall . |
| 5,666,040 | 9/1997 | Bourbeau . |
| 5,703,464 | 12/1997 | Karunasiri et al. . |
| 5,945,947 * | 8/1999 | Cunningham ................... 342/442 |

FOREIGN PATENT DOCUMENTS

| | | |
|---|---|---|
| 44 22 005 A1 | 12/1995 | (DE) . |
| 2 589 008 | 10/1985 | (EP) . |
| 2 654 553 | 11/1989 | (EP) . |
| WO 96/22625 | 7/1995 | (WO) . |
| WO 96/41408 | 12/1996 | (WO) . |
| WO 97/01725 | 1/1997 | (WO) . |

* cited by examiner

RADIO FREQUENCY ENERGY MANAGEMENT SYSTEM

The present application is a continuation of U.S. application Ser. No. 08/997,207, filed on Dec. 23, 1997 (now abandoned), application Ser. No. 08/997,207 is a continuation-in-part of U.S. application Ser. No. 08/495,984, filed Jun. 28, 1995 (issued as U.S. Pat. No. 5,703,464 on Dec. 30, 1997).

FIELD OF THE INVENTION

This invention relates to energy management systems for monitoring and controlling electrical power sources and, more particularly, to an energy management system for monitoring and controlling electric batteries or battery cells in a battery pack used to power electric vehicles by use of radio frequency data and control signal transmission.

BACKGROUND OF THE INVENTION

Energy management systems for monitoring and controlling the operation of electrical devices in conventional hydrocarbon powered vehicles are known in the art. Such systems may include(s) one or more device located near the particular electrical device to be monitored and controlled. These devices perform the desired monitoring or control functions in response to control signals provided by a central control unit or "brain". The central control unit is typically mounted at a location within the vehicle remote from the devices and is electrically connected to the device by a wiring harness. The control unit may include a processing system that processes any input signals received from the devices and transmits output signals to the devices to perform a specific control function. For example, the control unit can supply data to or even control a battery charger and be part of the charger itself. The processing system may be driven according to a specific control system program.

In conventional hydrocarbon powered vehicles, energy management is an ancillary feature that allows the vehicle's electrical functions, such as heating and cooling of the passenger compartment, to be performed in a more efficient or more comfortable manner. Such an energy management system may also operate to optimize the operation of the engine under particular conditions to improve engine efficiency or performance.

However, in electrically powered vehicles, energy management is not an ancillary feature but is a primary feature that is useful in monitoring and controlling the performance of the power source itself. In order to obtain maximum operating efficiency of an electrically powered vehicle, it is desired that the particular electric power source be controlled in such a manner to derive its maximum output capacity under a variety of different operating conditions. Accordingly, it is desired that the energy management systems is useful in electric powered vehicles, rather than monitor and control accessory electrical functions such as passenger compartment cooling and heating, operate primarily to monitor and control operating parameters of the power source itself, e.g., battery or battery cell voltage.

Energy management systems that are used with electrically powered vehicles to monitor and control the electric batteries, or individual cells in the batteries, used to power an electric vehicle, are known in the art. Such energy control systems are similar to those discussed above for use with hydrocarbon powered vehicles, in that such systems typically include one or more monitoring device and a central control unit. The monitoring devices are positioned near a particular battery or battery cell, and the central control unit is positioned within the vehicle at some remote location. Each monitoring device is connected to the central control unit by wired connection, typically by use of a wire harness, to facilitate transmission of information to and from the monitoring modules and the central control unit. The central control unit is configured to receive data from the monitoring devices, process the data, and produce control signals to the monitoring devices to effect a desired change in battery or battery cell operation.

In such systems, control signals are passed from the central control unit to a monitoring device, and information is passed from the monitoring devices to the central control unit through wires that run through the vehicle and connect each monitoring device with the central control unit. The wires can either be bundled together and routed along a primary wire harness for the vehicle's electrical system, or the wires may be routed separately from the primary wire harness.

A wire-type energy management system for monitoring and controlling operating parameters of an energy source in an electric powered vehicle is not desirable for a number of reasons. The use of wires, in addition to those already in the vehicle's electrical system, can add as much as fifty pounds to the weight of the vehicle. Such added weight can decrease the vehicle's acceleration and increase battery charge frequency. The use of a wire-type energy management system also increases the manufacturing cost of the vehicle, due both to the time associated with installing the additional wiring and the cost of the wire itself. The use of a wire-type energy management system also increases the cost of maintaining the system, because of the proximity of the wires connecting the monitoring devices to the batteries and resulting corrosion damage that is likely to occur. Such corrosion damage adversely effects the reliability and service life of a wire-type energy management system.

Additionally, the use of a wire-type energy management system requires use of high-voltage isolation components to reduce system interference or noise that may occur in signal wires from high-voltage wires that are typical of electric vehicle battery packs in the vehicle's electrical system. The use of such high-voltage isolation components both increases the manufacturing cost of the electric vehicle and increases vehicle weight. A wire-type energy management system is also limited in terms of future component upgrades, because of the need to provide additional wiring for each new upgraded component.

It is, therefore, desirable that an energy management system for use with an electric powered vehicle be constructed having multiple system devices capable of communicating with a central control unit in a wireless manner that does not add weight to the vehicle, is not vulnerable to battery corrosion, is easy and quick to install, does not require the use of high-voltage isolators, and that facilitates any upgrading or adding of new devices without modification. It is desirable that such an energy management system be configured having devices that are capable of being used to monitor and/or control one or more batteries or the battery cells of each such battery to perform control functions on such batteries to optimize battery performance, e.g., to provide battery equalization and/or battery thermal management, thereby optimizing the performance of a battery pack comprising such batteries. Particularly, it is desirable that the energy management system be configured to: (1) permit the detection of battery or battery cell changes; (2) enable storage of battery or battery cell performance information; (3) permit tracking battery or battery cell characteristics; and/or (4) permit control of a control device on a battery to optimize battery performance.

SUMMARY OF THE INVENTION

There is, therefore, provided in the practice of this invention a wireless radio frequency energy management system for use in an electrically powered apparatus such as an electric vehicle having a battery source of motive power. The energy management system includes a number of battery control modules and/or a control unit. The battery control modules can be configured for two-way communication with each other and/or with the control unit, or can be configured for one-way transmitting or receiving communication. Radio frequency signals transmitted and/or received by the battery control modules carry information relating to the operating parameters of an electric power source, e.g., a battery pack, individual batteries in a battery pack, or battery cells in batteries making up a battery pack. For two-way and one-way receiving battery control modules, the control unit is configured to receive such signals and transmit to the battery control modules control signals for regulating the operating parameters of such power source. Additionally, each battery control module can be adapted to transmit and/or receive control signals from other battery control modules without the need for a control unit.

In an EMS embodiment, each battery control module is configured to monitor one or more designated operating parameter(s) of the power source, and to control or regulate one or more operating parameter(s) according to a designated control signal received from the control unit. Each battery control module can include one or more monitoring or sensing element(s), each configured to measure a designated operating parameter of the power source, and at least one other device selected from the group consisting of a radio frequency receiver, a radio frequency transmitter, a controller, a memory device, control devices, and combinations thereof. The battery control module control devices can include, visual indicating devices, audible indicating devices, power source current shunting devices, radio frequency signal blocking devices, and combinations thereof. Each two-way battery control module includes a radio frequency transmitter and receiver and is configured to transmit battery operating parameter information to the control unit in response to a control signal.

The control unit is configured to monitor the operating parameter(s) of the power source measured by the sensing element(s) in each battery control module, and control the battery control modules to regulate such operating parameters. The control unit includes a radio frequency receiver configured to receive a radio frequency signal transmitted from the radio frequency transmitter in each battery control module. The control unit also includes a radio frequency transmitter configured to transmit a radio frequency control signal that is capable of being received by the radio frequency receiver in each battery control module. The control unit evaluates data transmitted from each battery control module regarding the operating parameter(s) of the power source, evaluates the data according to a predetermined control system program, and generates a predetermined control command that is transmitted as a control signal to the battery control modules. The control unit is adapted to control or provide battery information to, or control input based upon battery information, a battery charger or to other vehicle electrical management systems, e.g., a vehicle passenger compartment climate control system.

The EMS can include an interface device separate from the controller to allow access to one or more battery control modules by another device, e.g., an on-board power source charger, independently of the control unit. Additionally, the EMS can also include means for identifying the relative location of battery control modules in the system by radio frequency signal.

Radio frequency signals are transmitted between the control unit and each battery control module without the use of additional wiring, by using a main conductive path that runs between the batteries within a battery pack, through the battery pack, and to a power handling device of an existing electrical system. The main conductive path acts as a transmission medium for the radio frequency signal. By eliminating the need for additional wiring, wiring harnesses and the like to enable signal transmission, and by designing the energy management system as a modular construction, the resulting system is light weight, is not vulnerable to battery corrosion, is easy and quick to install, facilitates upgrading or adding of new modules without significant modification, facilitates easy switching or replacing of batteries or the entire battery pack, and requires fewer high-voltage isolators when compared to existing wired-type systems.

BRIEF DESCRIPTION OF THE DRAWINGS

These and other features and advantages of the present invention will become appreciated as the same becomes better understood with reference to the specification, claims and drawings wherein:

DETAILED DESCRIPTION

An energy management system (EMS) constructed according to principles of this invention includes a control unit and a number of battery control modules. Alternatively, an EMS constructed according to principles of this invention can be configured having a distributed control system, rather than one based on a single control unit, based upon the battery control modules. The EMS can be used for monitoring the performance of, measuring the operating parameters of, and/or controlling operating parameters of batteries, battery cells, or groups of batteries within a battery pack to optimize battery performance. The system of this invention can be used with battery packs for electrically powered devices such as electric vehicles and hybrid electric vehicles having a battery source of motive power (e.g., military vehicles, trains, wheelchairs, golf carts and other recreational vehicles, stackers, forklifts, industrial vehicles, buses, automobiles, and three wheel drive vehicles), in electrical power-storage applications (e.g., home emergency, business operation, boat, aircraft, or satellite power supplies), and in consumer electronic devices.

Figure 1:
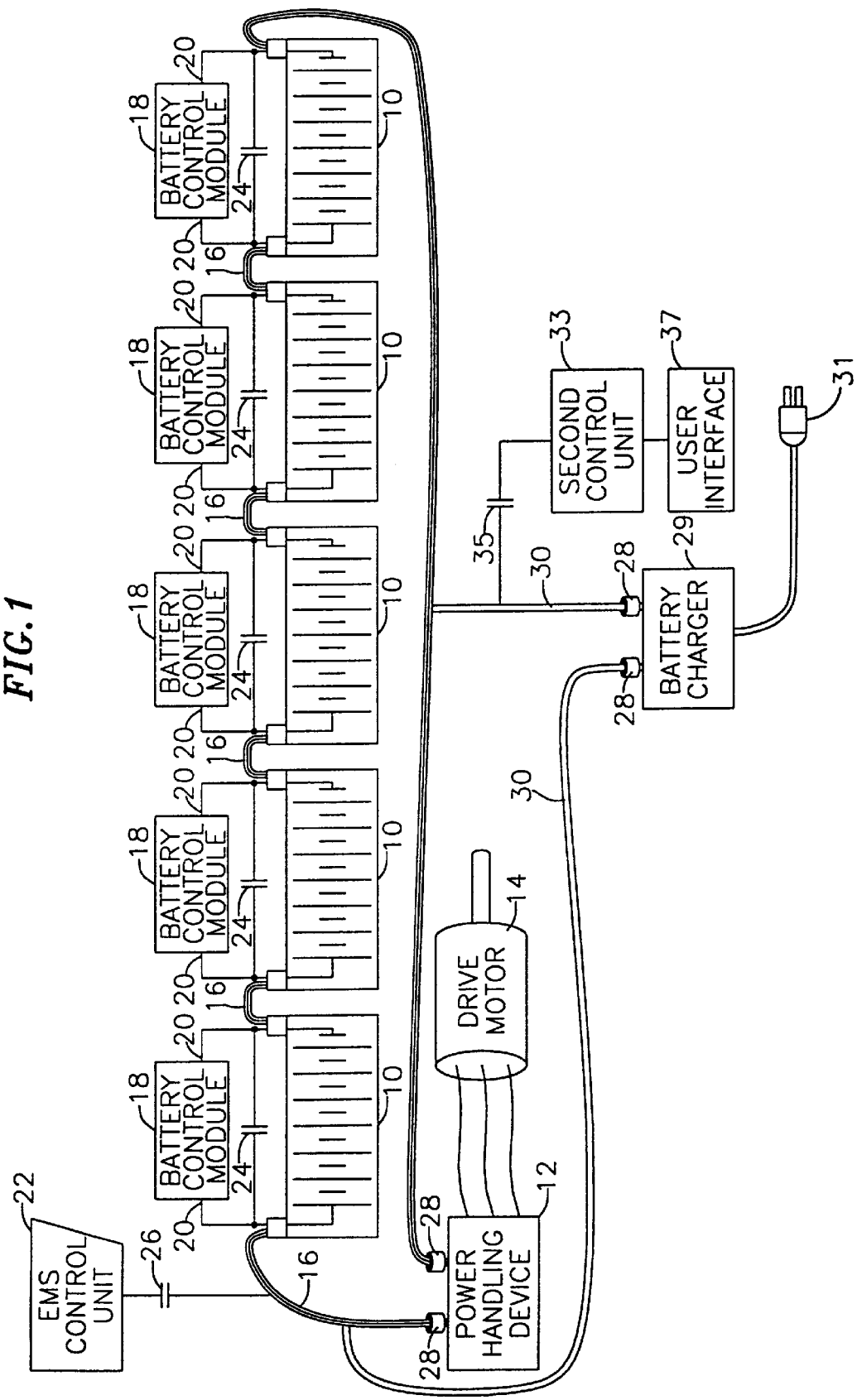
FIG. 1 is a schematic diagram of an energy management system constructed according to principles of this invention comprising a control unit and a number of battery monitoring modules.

Referring to FIG. 1, an EMS prepared according to this invention is illustrated as installed in an electrical system of an electrically powered device. The electrical system includes a number of batteries 10 that are connected in series to form a battery pack. In the embodiment illustrated, the battery control modules are shown as being used with five batteries 10, each of which being a lead-acid battery having a voltage in the range of from about 10 to 15 volts DC. It is to be understood that EMSs of this invention are intended to be used with many different types of batteries, i.e., batteries having other than lead-acid construction, for example nickel-cadmium, silver-zinc, lithium polymer, zinc-air, sodium-sulfur and the like. Although the EMS of this invention is described as being used with batteries, i.e., electrochemical storage devices, it is to be understood that EMSs of this invention can also be used with other types of energy storage devices such as mechanical, e.g., flywheel, and electrical, e.g., capacitor, storage devices. It is also understood that EMSs of this invention can be used with batteries configured differently within a battery pack, i.e., batteries connected in series, series/parallel, or parallel, than that specifically described and illustrated in FIG. 1. In addition, EMSs of this invention can be used with battery packs made up of identical types of batteries, or battery packs made up of combinations of different types of batteries, e.g., lead-acid and nickel-cadmium batteries, lead-acid and zinc-air batteries, lithium polymer and lead-acid batteries, zinc-air and nickel-cadmium batteries.

The electrical system of the apparatus also includes a power handling device 12. In an electric vehicle, the power handling device is a motor controller 12, which can be a conventional motor controller used to control the amount and polarity of voltage that is applied to one or more drive motor 14 used to turn a corresponding vehicle axle or wheel.

The electrical system of the apparatus includes a main conductive path or main conductor 16 formed from an assembly of one or more electrically conductive wires that is used to electrically connect together the batteries 10, to form a battery pack, and connect the battery pack with other primary electrical devices in the device. In an electrically powered vehicle, the main conductor 16 is used to connect the batteries 10 in series connection to form the battery pack, and is used to electrically connect the battery pack to the motor controller 12. Accordingly, in an electric vehicle power from the battery pack is routed via the main conductor 16 to the motor controller 12 for application to one or more drive motor 14.

An EMS constructed according to principles of this invention includes a number of battery control modules (BCM) 18 that can be configured to measure one or more power source operating parameter(s). As applied in a primary electrical system in an electric vehicle, each BCM can be used to monitor one or more operating parameter(s) of a battery pack, batteries in the battery pack, or battery cells in a battery making up the battery pack. As installed in an electric vehicle, each BCM is powered by 12 volts DC, supplied by connection between BCM power leads 20 and respective positive and negative terminals of an associated battery 10. Alternatively, rather than being powered by a respective battery, each BCM can be powered by an internal power source, by a power source on the vehicle other than a respective battery, by inductive transmission of AC power, by solar power and the like.

Each BCM 18 of the embodiment of FIG. 1 is configured to monitor one or more operating parameter(s) of a respective battery 10 in the battery pack. Accordingly, the number of BCMs used in the EMS shown in FIG. 1 is the same as the number of batteries 10 that are used to make up the battery pack, i.e., five. Alternatively, the BCMs can be used to monitor one or more operating parameter(s) of each battery cell in the batteries that make up the battery pack, in which case the number of BCMs used could be greater than the number of batteries. Alternatively, the number of BCMs used in the EMS can be less than the total number of batteries in a battery pack, e.g., where one or more BCM is adapted to monitor more than one battery. It is, therefore, to be understood that the BCMs can be used in a manner other than that specifically described above and illustrated in FIG. 1.

Additionally, although each BCM 18 is illustrated as being a device separate from each respective battery, it is to be understood that each BCM could alternatively be constructed as an integral part of the battery itself. For example, the BCM could be manufactured within a compartment in the battery housing, isolated from the electrolytic cells. In such an embodiment, all outputs from and/or inputs to the BCM would be connected to respective battery terminals or other battery inputs or outputs internally within the battery housing. The construction of a BCM as an integral part of the battery also permits the BCM to be removed from the battery-powered apparatus with the battery to enable off-board data retrieval from BCMs that are adapted to store battery operating parameter and/or battery performance information, such as battery current and voltage, minimum and maximum battery voltages, battery charge and/or discharge cycles, and the like.

Alternatively, the BCMs can be configured to be releasibly attachable to a respective battery used in a battery pack to facilitate both its removal from a battery, when a battery is removed from the battery pack, and its attachment to a battery when the removed battery is replaced with a new battery. For example, each BCM can be configured as part of the main conductor 16 that is used to connect the batteries within a battery pack. Additionally, BCMs embodied as a device separate from the respective battery can be configured to be removed from the electrically-powered apparatus, independent from or as part of a respective battery, to enable data retrieval from BCMs adapted to store battery operating parameter and performance information as discussed above. Also, where each BCM is configured to monitor the operating parameters of individual battery cells, the BCMs are configured to be releasibly attached to a respective battery cell.

In an example embodiment, each BCM 18 is constructed to monitor and measure one or more designated operating parameter(s) of a respective battery 10. The particular operating parameter(s) monitored and measured by each BCM can vary, depending on each particular application, but may include battery voltage, battery current, battery cell electrolyte density or specific gravity, specific gravity gradient, electrolyte level, battery temperature, battery pressure, and combinations thereof. These operating parameters can be used to determine the performance of the battery. Each BCM 18 is constructed to monitor desired battery operating parameters such as voltage output and temperature of each respective battery, and transmit operating parameter information to the control unit in response to a control signal. In one EMS embodiment, each BCM 18 is also constructed to control designated operating parameters of a respective battery such as battery voltage, resistance, temperature, current and the like, in response to a control signal, i.e., such BCM enables two-way communication between itself and another EMS device. In another EMS embodiment, each BCM is constructed to permit one-way communication from itself to another EMS device or visa versa.

In an EMS embodiment comprising BCMs that provide two-way communication, each BCM is constructed to control desired battery operating parameters, e.g., the voltage, current, or effective resistance of a respective battery within the battery pack, by transmitting such information to an on-board EMS control unit 22, described in better detail below, and receiving a control signal from such control unit to execute a particular function. Additionally, two-way BCMs can be constructed to communicate information between each other independent of the control unit to perform certain desired operations, e.g., to communicate voltage information between the BCMs and to provide a predetermined control function in response thereto. In such an embodiment, the BCMs themselves would provide a distributive control system, thereby supplementing or supplanting the control unit.

In an EMS embodiment, comprising BCMs that provide one-way communication by transmitting information only, each BCM is constructed to monitor desired battery operating parameters and transmit battery operating parameter information to the EMS control unit according to a predetermined reporting algorithm. In an EMS embodiment, comprising BCMs that provide one-way communication by receiving a control signal only, each BCM is constructed to receive a control signal from the control unit to execute a particular function. EMSs of this invention can comprise all two-way BCMs, all of either type of one-way BCMs, or a combination thereof. Additionally, BCMs of this invention can be configured to store desired battery operating parameter and/or performance information for on-board or off-board retrieval.

A key feature of the EMS of this invention is that communication between the control unit and each BCM is achieved by using a radio frequency signal, rather than by conventional transmission means such as by using electrically conductive wires. A two-way or one-way transmitting BCM of this invention is constructed to receive an analog input signal from one or more monitoring element or sensor for a respective battery, convert the analog signal to a digital signal, and transmit the signal using a designated radio frequency to an EMS control unit 22, described in greater detail below. To facilitate transmission of the radio frequency signal within the vehicle, the main conductor 16 serves as a transmission medium and radio frequency inputs and outputs of each BCM 18 and the control unit 22 are connected thereto. The main conductor 16 acts as a transmission medium to transmit the radio frequency signal from each such BCM to the EMS control unit, or from one BCM to another, without the need to add additional wiring.

An EMS constructed according to principles of this invention includes an EMS control unit 22 that comprises a signal conductor connected to the main conductor 16 for purpose of receiving and/or transmitting radio frequency signals to and from each BCM 18. The control unit 22 is located on board the battery-powered apparatus. The location of the control unit may depend on a number of different variables such as available room, battery pack type and the like. In certain embodiments, the control unit 22 can be manufactured as part of a power handling device or motor controller 12. In an EMS embodiment comprising two-way BCMs, the control unit 22 is constructed to receive battery operating parameter information from one or more designated BCMs, process the information according to a predetermined control system program, and transmit monitoring, measuring and/or control instructions to one or more designated BCMs 18. In an EMS embodiment comprising one-way transmitting BCMs, the control unit 22 is constructed to only receive battery operating parameter information from one or more designated BCM. In an EMS embodiment comprising one-way receiving BCMs, the control unit 22 is constructed to send battery operating parameter control signals to one or more designated BCM.

A key feature of the control unit 22 is that, like the BCMs 18, it is constructed to receive radio frequency signals from or transmit radio frequency signals to each of the BCMs 18 through the main conductor 16. FIG. 1 illustrates an EMS comprising a control unit 22 that is constructed as a single unit. When used with two-way BCMs, the control unit takes the input radio frequency signal from each BCM and converts it to a digital signal. The digital signal is then sent through a processor, which evaluates the digital signal according to a control system program and provides a digital output control signal. Such control unit 22 is constructed to take the digital output control signal, convert it to a radio frequency control signal, and transmit the radio frequency control signal to one or more designated BCM 18.

Figure 4:
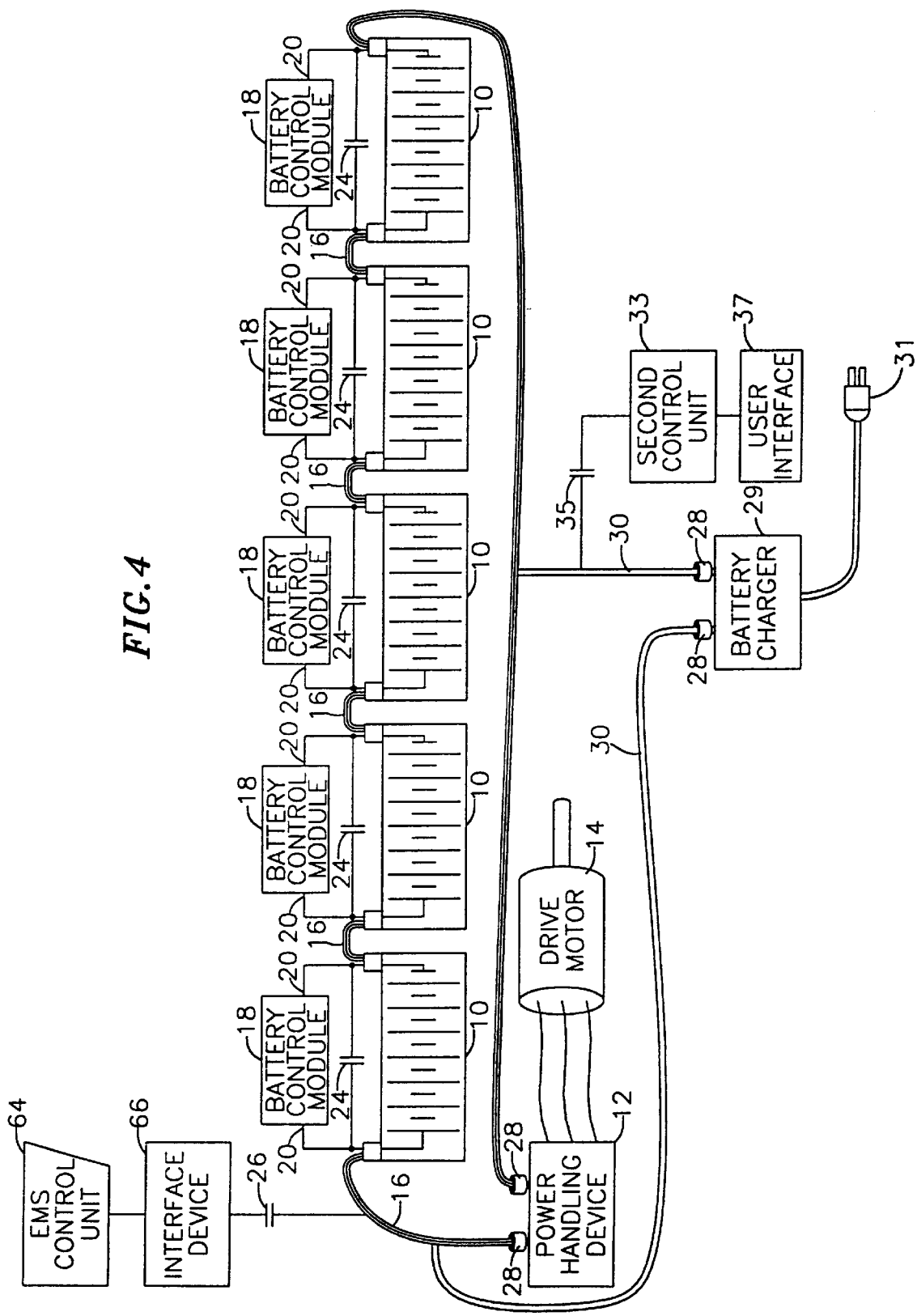
FIG. 4 is a schematic diagram of an energy management system embodiment comprising a control unit and a separate serial interface.

FIG. 4 illustrates another EMS embodiment comprising a control unit 64 that is constructed to operate with a separate interface device 66. When used with two-way BCMs, the separate interface device 66 operates both to receive the radio frequency signals sent from the BCMs and convert them to digital signals for forwarding to the control unit 64, and to receive digital output control signals from the control unit 64 and convert them to radio frequency control signals for forwarding to one or more designated BCMs 18, or to another EMS device, e.g., an on-board battery charger.

To permit communication from the control unit 22 to one or more designated BCMs 18, the EMS control unit includes means encoding or addressing each output control signal to be recognized by one or more designated BCM 18. Each BCM is also constructed having complementary means for reading the control signal to determine whether the control signal is addressed to that particular BCM. Constructed in this manner, the control unit 22 is able to transmit control signals to one or more designated BCM. Additionally, in an alternative embodiment, each BCM can be configured to recognize more than one addressed control signal to permit the control unit to control more than one BCM simultaneously. This is desirable under certain operating conditions, such when the energy source or battery pack is cold and it is desired that a number of BCMs be controlled to heat a number of batteries in the battery pack and, thereby provide enhanced battery performance. It is also desired that the BCMs be configured to respond simultaneously to a given command signal sent by the control unit to provide such information as battery voltage taken simultaneously from each battery in a battery pack, or to store such acquired information in a BCM memory device for subsequent retrieval, e.g., by radio frequency transmission in response to a designated control signal sent by the control unit.

Referring still to FIG. 1, an EMS constructed according to principles of this invention may include means for insuring that radio frequency signals between the control unit 22 and each BCM 18 are not interrupted or disconnected in the event of an open circuit across a battery. In one embodiment, such means is a capacitor 24 that is placed across the positive and negative terminals of each respective battery 10 in parallel electrical connection with the power leads 20 of a respective BCM. The capacitor provides for the passage radio frequency signals across a battery in the event of an open circuit. Without the use of such capacitors 24, an open circuit in a battery within the battery pack could cut off radio frequency transmission between the control unit and those BCMs downstream from the open circuit. It is to be understood that each capacitor 24 is disposed within a respective BCM, but is illustrated in FIG. 1 as being outside of each BCM only for purposes of clarity and illustration.

An EMS constructed according to principles of this invention can also include means for protecting the control unit 22 from high-voltage differentials between the main conductor 16 and the control unit, and for filtering out signals other than the radio frequency signals transmitted by the BCMs. In one embodiment, such means is a capacitor 26 connected in line between the control unit 22 and the main conductor 16. The capacitor serves primarily to isolate the control unit 22 from any high-voltage differentials that may develop. The capacitor 26 also has high-pass filter characteristics to enable the passage of radio frequency signals to and from the control unit. The lower cutoff frequency of the high-pass filter is determined by the values of frequencies being used for radio frequency communication, and is set at approximately 30 kilohertz in this embodiment. It is to be understood, however, that the use of such capacitor 26 is optional.

An EMS constructed according to principles of this invention can also include means for preventing passage of high-frequency signals from other electrical devices connected to the electrical system by the main conductor 16, and for preventing the leakage of radio frequency signals from the EMS to the power handling device or motor controller. In an example embodiment, such means are used to ensure that the radio frequency signals generated by each BCM is transmitted to the control unit, and to ensure that each radio frequency control signal generated from the control unit to each BCM, free from high-frequency interference or signal leakage. In one embodiment, such means are used to eliminate the passage of high-frequency signals generated by the motor controller 12 to the main conductor 16, and to prevent the passage of the radio frequency signals from the main conductor to the motor controller. In a preferred embodiment, the means for preventing the passage of high-frequency signals from the motor controller, and for eliminating radio frequency leakage by the motor controller, includes isolation bands 28 that are made from a signal filtering material. The bands 28 are each placed around the main conductor 16 adjacent each connection point to the motor controller 12.

In a preferred embodiment, the bands 28 are made from ferrite beads, which are designed to filter out or prevent the passage of high-frequency signals above about 100 Kilohertz from the motor controller 12 into the main conductor 16. The ferrite beads also prevent transmission of the EMS radio frequency signal into the motor controller to eliminate signal leakage.

Figure 5:
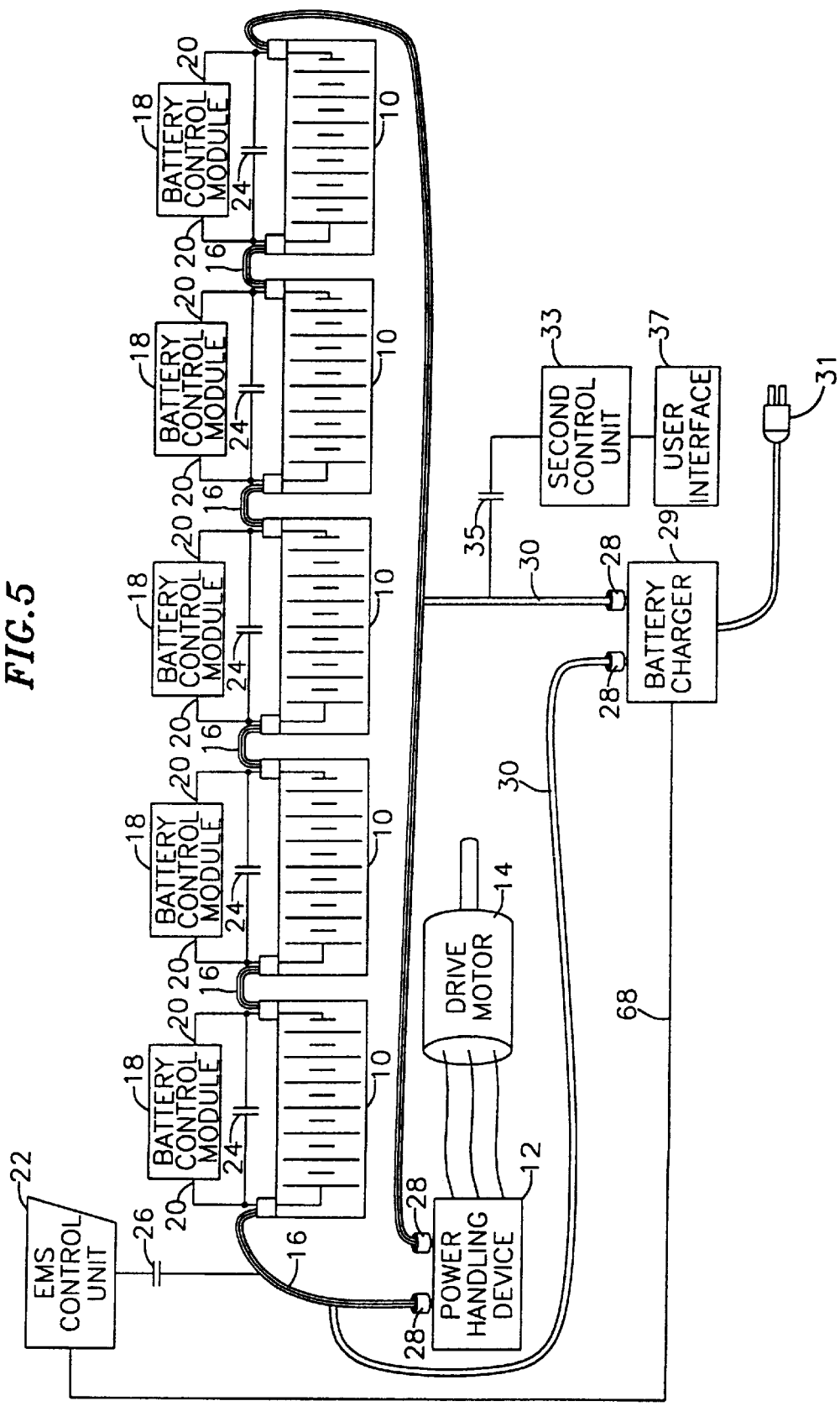
FIG. 5 is a schematic diagram of an energy management system embodiment comprising a control unit wired to an on-board battery charger.

Referring again to FIG. 1, the electrical system of the electrically powered device or vehicle includes a battery charger 29. The EMS is illustrated as being adapted for connection with a battery charger 29. In one embodiment, the battery charger 29 can be disposed on board the electric vehicle and includes DC power leads 30 that are electrically connected to the battery pack via the main conductor 16. Bands 28, identical to those discussed above, are placed around the leads 30 adjacent each connection point to the charger 29 for the same purposes previously discussed. The charger 29 includes a power lead 31 that is adapted to facilitate connection with an external AC power source. The battery charger 29 can be located either on or off board the vehicle. In one EMS embodiment, the battery charger 29 and control unit 22 are manufactured as a single device that is mounted on board the vehicle. In the EMS embodiment illustrated in FIG. 1, the battery charger 29 is mounted on board the electrically-powered apparatus or vehicle and is separate from the control unit 22. In still another EMS embodiment, illustrated in FIG. 5, the battery charger can be mounted on board the vehicle and configured to receive a control signal, in digital or analog form, via wiring 68 from the on-board control unit 22. The battery charger 29 can be configured to query the EMS for battery information and can include its own processor that is capable of interfacing with the BCMs either independently, i.e., without accessing the control unit 22, or through the control unit.

In an alternative EMS embodiment, the battery charger 29 is disposed off board of the electric vehicle and includes DC power leads 30 that are adapted to facilitate temporary electrical connection with the main conductor 16 when charging the battery pack. The temporary electrical connection can be made by using conventional attachment techniques such as by using releasible hard wire-type connections, inductive coupling and the like. Like the on-board charger embodiment, bands 28 are placed around the power leads 30 adjacent the connect point to the off-board charger. The off-board charger can be part of a battery pack charging system maintained at a vehicle repair facility, at a public or private parking garage and the like.

The EMS includes a second control unit 33 located off board of the vehicle. The second control unit or off-board control unit 33 is attached to a lead 30 of the on-board or off-board charger 29. The off-board control unit 33 is configured in the same manner as the control unit 22 described above and below, to communicate with the on-board control unit 22 and/or the BCMs by radio frequency transmission via wired, radio, or inductive signal coupling. Specifically, the off-board control unit 33 serves to monitor battery operating parameters and control one or more BCM to regulate the operation of one or more battery, or battery cell, when charging the battery pack. Additionally, as described in better detail below, the off-board control unit is used to retrieve battery operating performance information, stored in the on-board control unit 22 and/or BCMs, during charging or during other type of battery pack servicing or maintenance. A capacitor 35, identical to the capacitor 26 discussed above, is placed in line between a radio frequency transmission line from the off-board controller and the lead 30.

The off-board control unit 33 is adapted to accommodate connection with a user interface 37 to facilitate programming the on-board control unit 22 and accessing information stored in the on-board control unit and/or BCMs. In certain embodiments, the off-board control unit is manufactured as part of the off-board charger, and is programmed to receive downloaded battery performance information from BCMs or the control unit 22 and regulate battery operating parameters during battery pack charging. Alternatively, the user interface 37 can also be adapted to communicate directly with the on-board control unit 22, to retrieve desired information or to program the control unit, via suitable connection means, e.g., by analog signal, digital signal, radio frequency signal, and the like. Additionally, the user interface 37 can be used to program or retrieve information from other devices that communicate with or are controlled by the EMS, e.g., the motor controller and/or battery charger.

Figure 2:
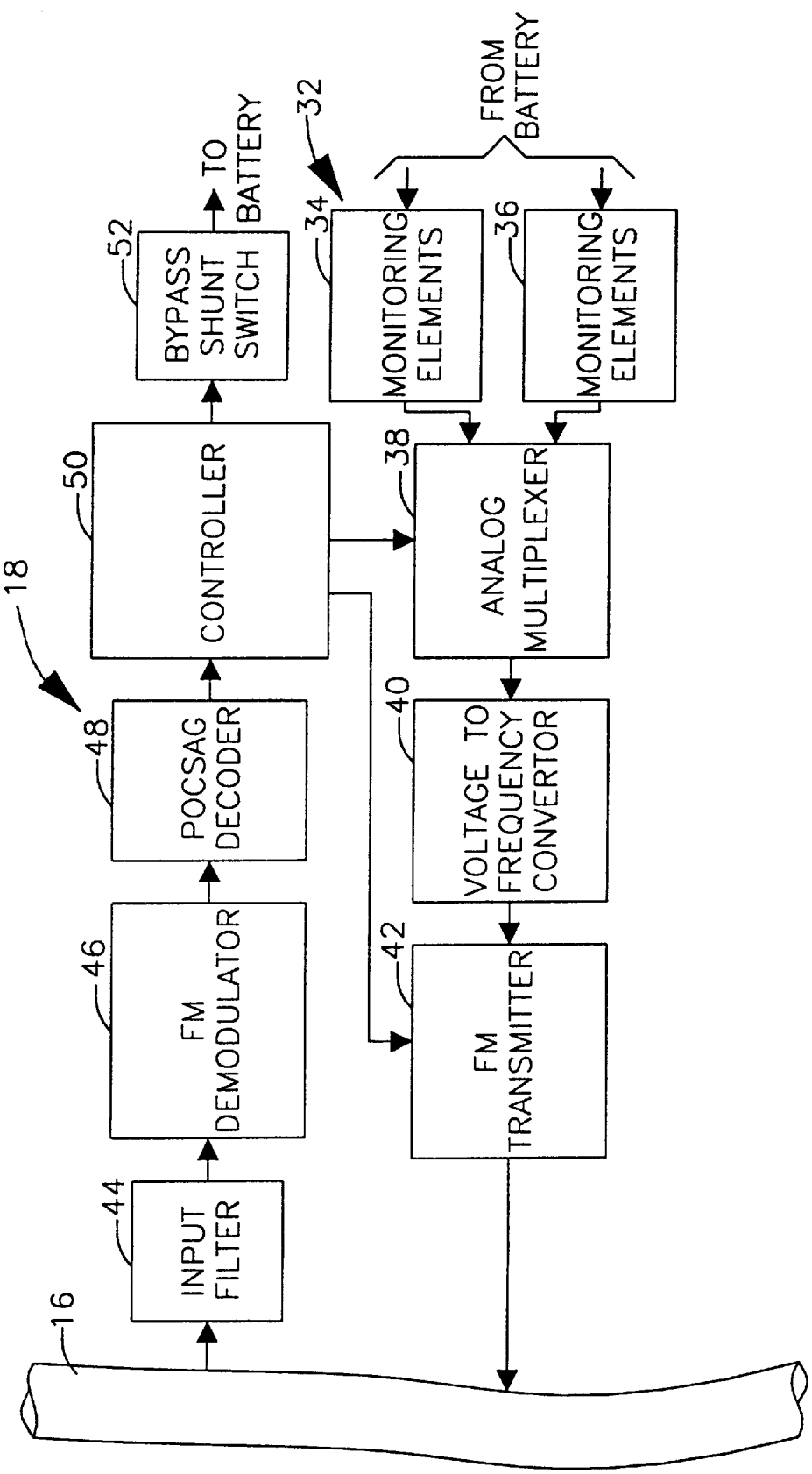
FIG. 2 is a schematic diagram of a battery control module illustrated in FIG. 1.

Referring now to FIG. 2, each BCM 18 includes monitoring element(s) or sensor(s) 32 that are configured to measure or monitor a designated power source or battery operating parameter. In one embodiment, each BCM 18 includes two monitoring elements 34 and 36 for measuring the voltage and temperature of a respective battery. Each monitoring element 32 is configured to operate on 12 volt DC power and provide an analog signal output in the range of from about zero to five volts DC. In an embodiment where a BCM includes more than one monitoring element 32, an analog multiplexer 38 is provided that is configured to accommodate the analog signal outputs from each monitoring element, e.g., the voltage monitoring element 34 and the temperature monitoring element 36. Operation of the multiplexer 38 is controlled by a controller in the BCM, discussed in greater detail below.

Each two-way and one-way transmitting BCM 18 includes a voltage to frequency convertor 40, which is configured to receive an input analog signal from the analog multiplexer 38 and convert the analog signal to a digital signal that is configured as a particular series of voltage pulses and the like. In one embodiment, the convertor 40 is configured to receive an input analog signal of from zero to five volts DC and convert the input signal to a pulsed signal of either no output (also referred to as logic 0) or an output of about five volts (also referred to as logic 1), wherein the voltage information is encoded as the frequency of a pulse train. However, it is to be understood that the transmission of data can be achieved by other common analog and digital transmission methods.

Each two-way and one-way transmitting BCM 18 includes a radio frequency (RF) transmitter 42 that is configured to modulate the pulsed signal output from the convertor 40. The radio frequency transmitter 42 can be a broadband transmitter, such as a frequency shift keying (FSK) transmitter. An output from the RF transmitter 42 is connected to the main conductor 16 so that the radio frequency signal is transmitted via the main conductor 16 to the control unit 22. In one embodiment, the RF transmitter 42 is configured to transmit a broadband radio frequency signal of approximately 5.5 megahertz. Operation of each RF transmitter is controlled by a timer circuit in a controller of the respective BCM.

Each two-way and receiving one-way BCM 18 includes means for eliminating the passage of high-frequency signals, outside of the range of radio frequency signals transmitted by the EMS, into the BCM. In one embodiment, such means is in the form of an input filter 44 connected in line between the main conductor 16 and an RF demodulator in the BCM. In one embodiment, the input filter 44 is configured as a 4.5 megahertz bandpass filter to prohibit the passage of radio frequency signals above or below approximately 4.5 megahertz, and is configured as a common-mode rejection filter to thereby reduce or eliminate possible signal interference.

In one EMS embodiment, a radio frequency signal sent from the control unit 22, via the main conductor 16, is transmitted to each two-way or one-way receiving BCM at a broadband radio frequency of approximately 4.5 megahertz, depending on the particular digital control signal. Each radio frequency control signal transmitted by the control unit is made up of an address string to one or more BCM, and a particular command string. Each BCM 18 used in such EMS embodiment includes an RF demodulator 46 or the like that is configured to receive a radio frequency control signal transmitted from the control unit 22 and demodulate it to a digital signal. In one embodiment, the RF demodulator 46 is capable of receiving the broadband radio frequency control signal of 4.5 megahertz and converting it to a digital signal zero or five volts.

Each BCM 18 used in such EMS embodiment includes means for decoding the digital control signal that is received from the RF demodulator 46. In one embodiment, the decoding means is a post office code standardization advisory group (POCSAG) decoder, which is also known as a consultative committee international radio (CCIR) paging code No. 1. However, it is to be understood that other well known decoding means can be used. The POCSAG decoder 48 is capable of identifying whether the digital control signal, i.e., the addressed command string, that is received is addressed to one or more particular BCM 18. If a correctly addressed code is recognized, the POCSAG decoder 48 transfers the remaining portion of the signal, i.e., the command string, to a controller 50. If an incorrectly addressed code is received by the POCSAG decoder 48, the remaining command string is not passed on to the controller 50. As mentioned above, each BCM 18 can be configured to recognize one or more address code so that groups of more than one BCM can be controlled simultaneously if desired. Available transceivers also provide built-in communication and/or network protocols that can be used in place of the POCSAG decoder 48 discussed above.

Although a BCM has been illustrated in FIG. 2 and described above as comprising a separate input filter 44, FM modulator 46, decoder 48, and FM transmitter 42, it is to be understood that the use of such separate devices can be replaced by one or more integrated devices capable of providing the same functions, such as a transceiver.

For two-way and one-way receiving BCMs, the controller 50 is configured to accept the input digital control signal, i.e., the command string sent from the control unit 22, and to identify whether it matches a predetermined command. In a preferred embodiment, the controller 50 performs simple pattern matching to determine whether or not the command string corresponds to one of the following thirteen predetermined commands: (1) shunt and transmit voltage; (2) shunt and transmit temperature; (3) shunt and do not transmit; (4) transmit temperature; (5) transmit voltage; (6) do not shunt and do not transmit; (7) record voltage and store value in BCM memory device; (8) transmit voltage stored in BCM memory device; (9) turn on BCM LED or other visual indicating means for a period of time; (10) turn on BCM LED or other visual indicating means and keep on; (11) turn off BCM LED or other visual indicating means; (12) turn on and/or off BCM buzzer or other audible indicating means; or (13) turn on/off current shunting element. Once the controller 50 has identified a particular command string, it outputs a control signal to activate a particular device. The control signal may be sent to activate one or more device(s) comprising the RF transmitter 42, the analog multiplexer 38, and one or more control device(s), discussed below. The controller 50 can also be programmed to cause the BCM to perform battery monitoring and controlling functions in response to internal criteria, or in response to signals sent by other BCMs, rather than in response to control signals from the control unit 22.

As shown in FIG. 2, for a two-way BCM, an output from the controller 50 is connected to the RF transmitter 42, to operate the transmitter in response to a particular command string received from the control unit 22, such as commands 1–2 and 4–5 above. The output from the controller 50 is also connected to the analog multiplexer 38, to switch between the voltage and temperature monitoring elements 34 and 36 in response to a particular command received from the control unit 22, such as commands 1–2 and 4–5 above.

Figure 6:
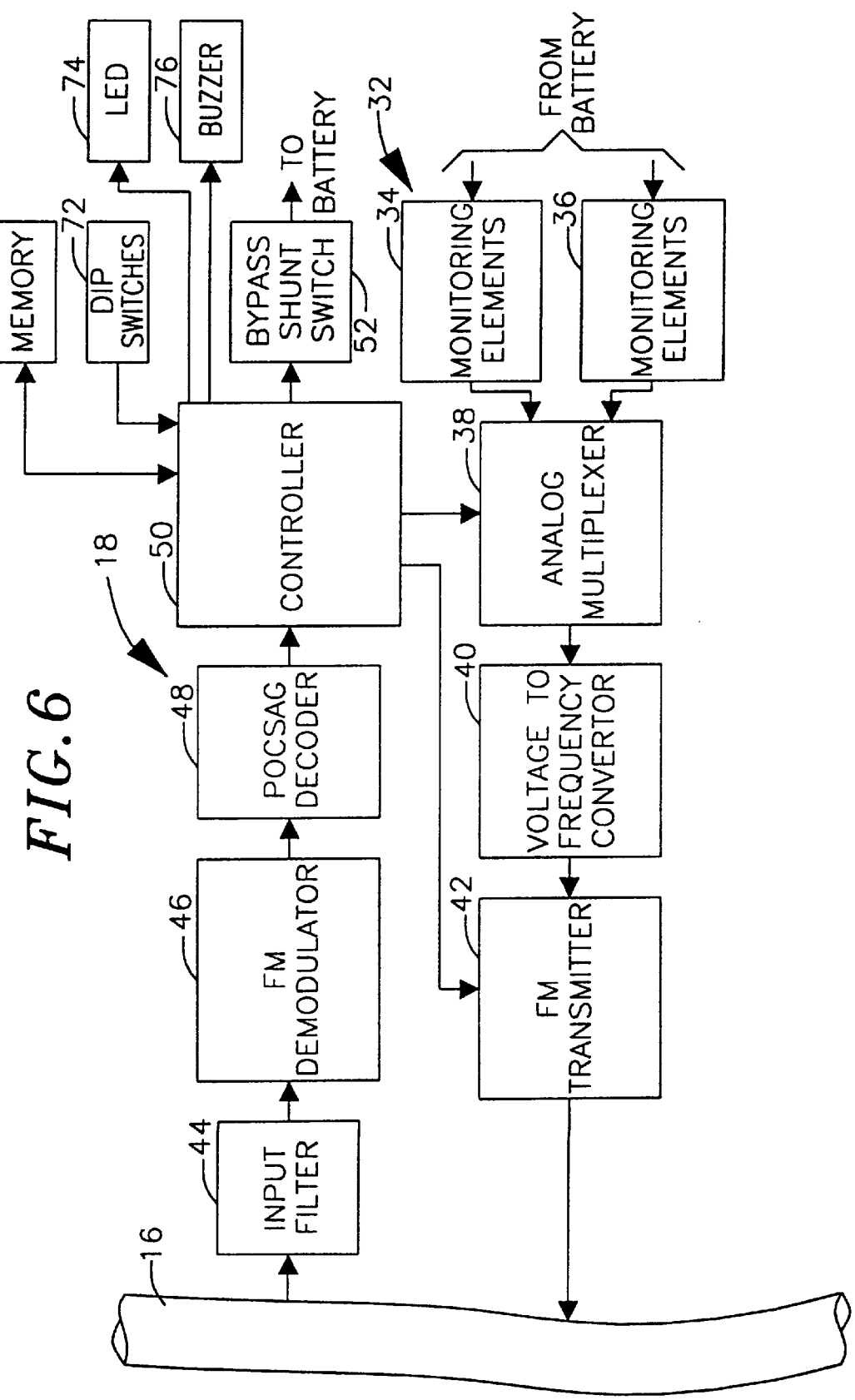
FIG. 6 is a schematic diagram of a battery control module comprising a memory device.

BCMs of this invention can also be configured to store battery parameter and/or performance information. Referring to FIG. 6, in such BCMs, the controller 50 is connected to a memory device 70 that is configured to store battery operating parameter and battery performance information gathered from the monitoring elements 34 and 36, and provide such stored information to the controller when retrieval is desired. The memory device can be a serial EEPROM, SRAM, flash memory or other type of non-volatile memory, including memory that is on-board of the controller 50.

Battery operating parameter and performance information gathered by the monitoring elements 34 and 36 are passed to the controller 50 via the analog multiplexer 38 when storage of such gathered information is desired. The controller 50 can be operated to store such information, for example, in response to a particular RF control signal sent from the control unit 22. The stored information can include instantaneous and average battery voltages, minimum and maximum battery voltages, individual battery cell information, the number and depth of battery charge and discharge cycles, battery age and the like. The ability to store such battery operating parameter/performance information in a BCM is desirable, e.g., to determine whether or not a monitored battery has been used properly for purposes of validating a battery warranty. For a two-way BCM, the stored information can be accessed from the memory device 70, e.g., in response to a RF control signal sent to the controller 50 from either the on-board control unit 22 or the off-board control unit 33, by RF signal via the FM transmitter 42. For a one-way transmitting BCM, the stored data can be transmitted for retrieval based on internal controller 50 programming.

Additionally, as illustrated in FIG. 6, a BCM of this invention can be configured to include analog or digital means for providing BCM location and identification information to the control unit 22, other BCMs, or other EMS device. In an example embodiment, such locating means is in the form of a DIP switch 72 that is connected to the controller 50. The DIP switch 72 for each BCM can be set during the component or vehicle assembly process so that each BCM can be independently identified, allowing each two-way or one-way transmitting BCM to transmit such DIP switch positioned to the control unit or other EMS device for indicating BCM position within a battery pack. Additionally, the DIP switches can be used to identify and/or differentiate different battery types within a battery pack, e.g., to identify and/or differentiate a lead-acid battery from a nickel-cadmium battery.

If desired, as illustrated in FIG. 6, a BCM of this invention can include a visual indicating means and/or an audible indicating means for purposes of identifying a BCM in a battery pack. In an example embodiment, a suitable visual indicating means is a LED 74 that is connected to the BCM controller 50 and that is positioned on the BCM to permit visual observation when the BCM is disposed within a battery pack. The LED 74 can be activated by a control signal from the control unit 22, by an internal BCM protocol, by a signal from another BCM, or by a signal from some other EMS device. In an example embodiment, a suitable audible indicating means is a buzzer 76 that is connected to the BCM controller 50 and that is positioned on the BCM to permit audible indication when the BCM is disposed within a battery pack. Like the LED, the buzzer 76 can be activated by a control signal from the control unit 22, by an internal BCM protocol, by a signal from another BCM, or by a signal from some other EMS device. For example, the LED and/or buzzer of one or more BCMs can be activated by a control signal from the control unit 22 in response to a change in the sensed battery parameters for respective batteries.

Figure 7:
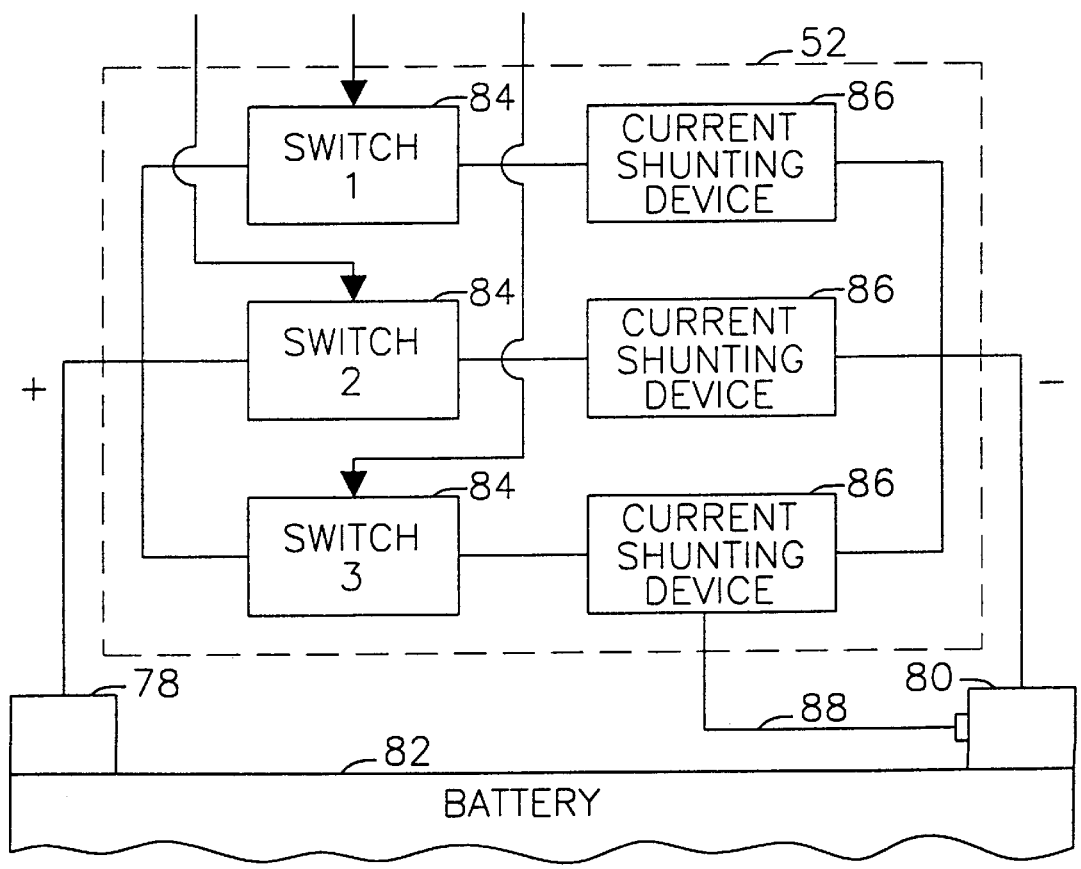
FIG. 7 is a schematic diagram of an energy management system battery shunt device.

The output from the controller 50 can also be connected to one or more control element or device to effect some change in one or more operating parameter(s), or effect thermal management, of the respective battery or battery cell monitored by the BCM 18. In one embodiment, the control device is a bypass shunt device (BSD) 52. As illustrated in FIG. 7, the BSD 52 is positioned across the positive and negative terminals 78 and 80 of a respective battery 82 and may be configured to discharge a respective battery within the battery pack through one or more current shunting devices, depending on a particular control signal that is received. In an example embodiment, the BSD 52 includes one or more switches 84, that are arranged in parallel and that are configured to receive a control signal from an EMS device, e.g., the control unit 22 or BCM controller 50. Attached in series with each switch is a particular current shunting device 86 that is put into operation by activating a respective switch 84. The type of current shunting devices that are selected for use with the BSD 52 can vary depending on the particular application, but can include one or more different shunt resistors that can be used to achieve a desired discharge rate for respective battery to achieve battery equalization within a battery pack. Additionally, the current shunting device 86 can be a thermoelectric device for effecting thermal management of a respective battery, e.g., to warm or cool the battery to optimize battery operating or charging conditions. Accordingly, the BSD 52 can be used to bypass the battery current for purposes of battery equalization or for purposes of battery thermal management. It is to be understood that although the BSD 52 in FIG. 7 is illustrated separately from the BCM for purposes of clarity, such BSD 52 can be configured as part of a respective BCM.

In one embodiment, the BSD 52 is configured to discharge a respective battery upon activation by the controller 50 in response to a command received from the control unit, such as commands 1–3, for purposes of achieving battery equalization. The BSD 52 does this by drawing current away from the battery using one or more resistors as the current shunting device 86. If desired, the BSD 52 can include a further thermal connection 88 from the shunt resistor (see current shunting device 3 in FIG. 7) to one of the battery terminals or other suitable metal battery element to use such battery terminal as a heat sink for the resistor. Using the battery terminal as a shunt resistor heat sink is desirable because it eliminates the need for the BSD 52 to contain a heat sink therein, thereby reducing the overall size of the BSD 52. As discussed above, activating a shunt resistor in a BSD in one or more BCM to discharge one or more batteries in a battery pack may be desired, for example, to control the voltage output of each individual battery in the battery pack to achieve battery equalization, or to protect a battery from harmful effects of overcharging. BSDs of this invention can also be configured and operated by their respective BCM to shunt individual battery cells within a battery.

Figure 8:
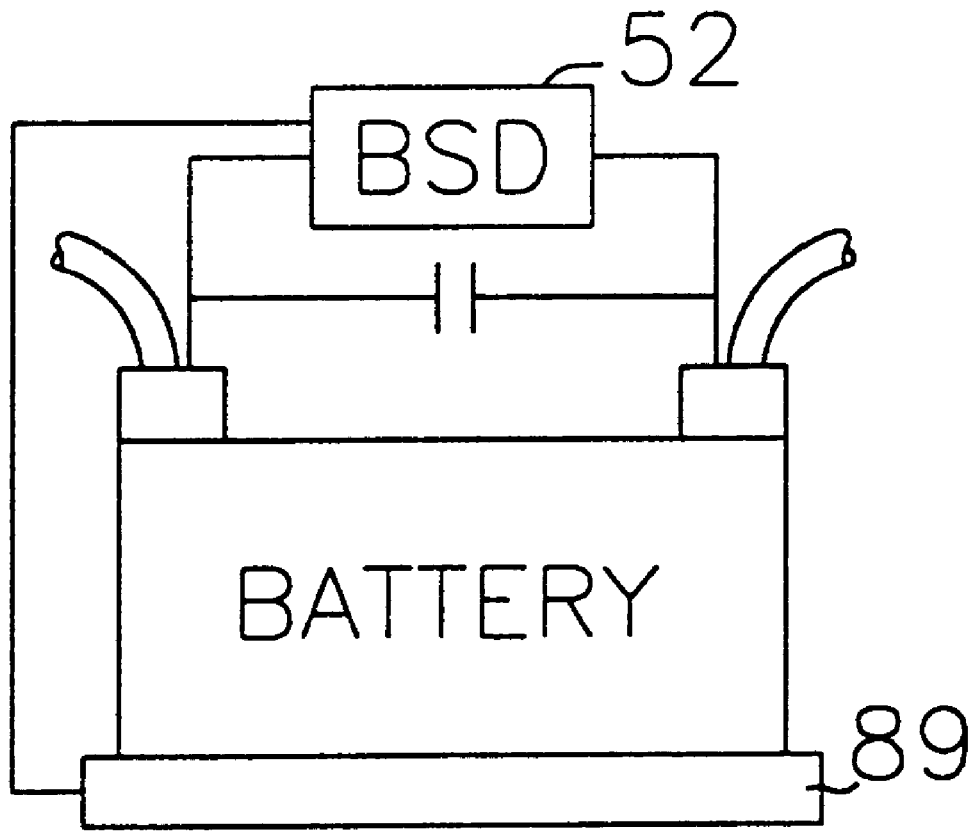
FIG. 8 is a schematic diagram of an energy management system battery heating means.

FIG. 8 illustrates a BSD 52 comprising a thermoelectric current shunting device in the form of a battery heating means 89 for effecting battery thermal management. In an example embodiment, such battery heating means 89 can be in the form of an external heating means, e.g., a heating pad or blanket disposed along an outside surface of the battery, or in the form of an internal heating means, e.g., in the form of a heating device disposed within the battery itself. In either embodiment, such a BSD current shunting device is configured to heat the battery when a current from the battery is routed therethrough in response to a control signal being sent to a respective switch in the BSD 52. The use of a battery heating current shunting device is desired, e.g., for purposes of preheating the battery to achieve a desired operating temperature in low-temperature conditions. Alternatively, a battery cooling current shunting device, e.g., a Peltier module, could be used to cool the battery under certain battery operating conditions. In one embodiment, a current shunting battery heating means 88 is in the form of an external heating pad that is positioned underneath the battery. The heating pad is configured to produce a desired degree of heat, to heat the battery by conduction, in response to passing the battery current therethrough. Additionally, if so desired, the shunting battery heating means can be configured to heat individual cells within a battery. For example, a BCM for a particular battery can control a number of BSDs that are each configured to perform a shunting function on the respective individual battery cells of the battery.

Figure 9:
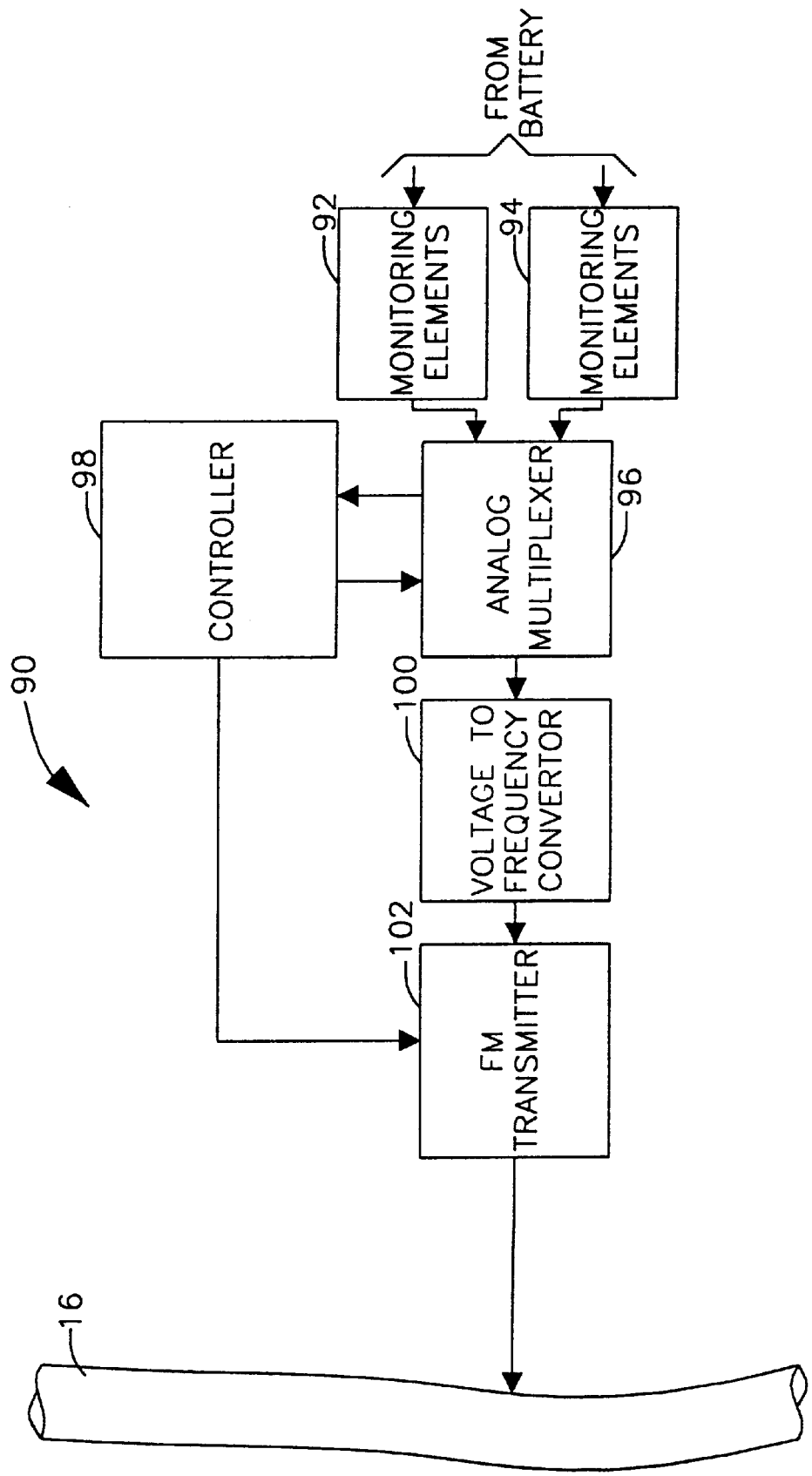
FIG. 9 is a schematic diagram of an one-way transmitting battery control module.
Figure 10:
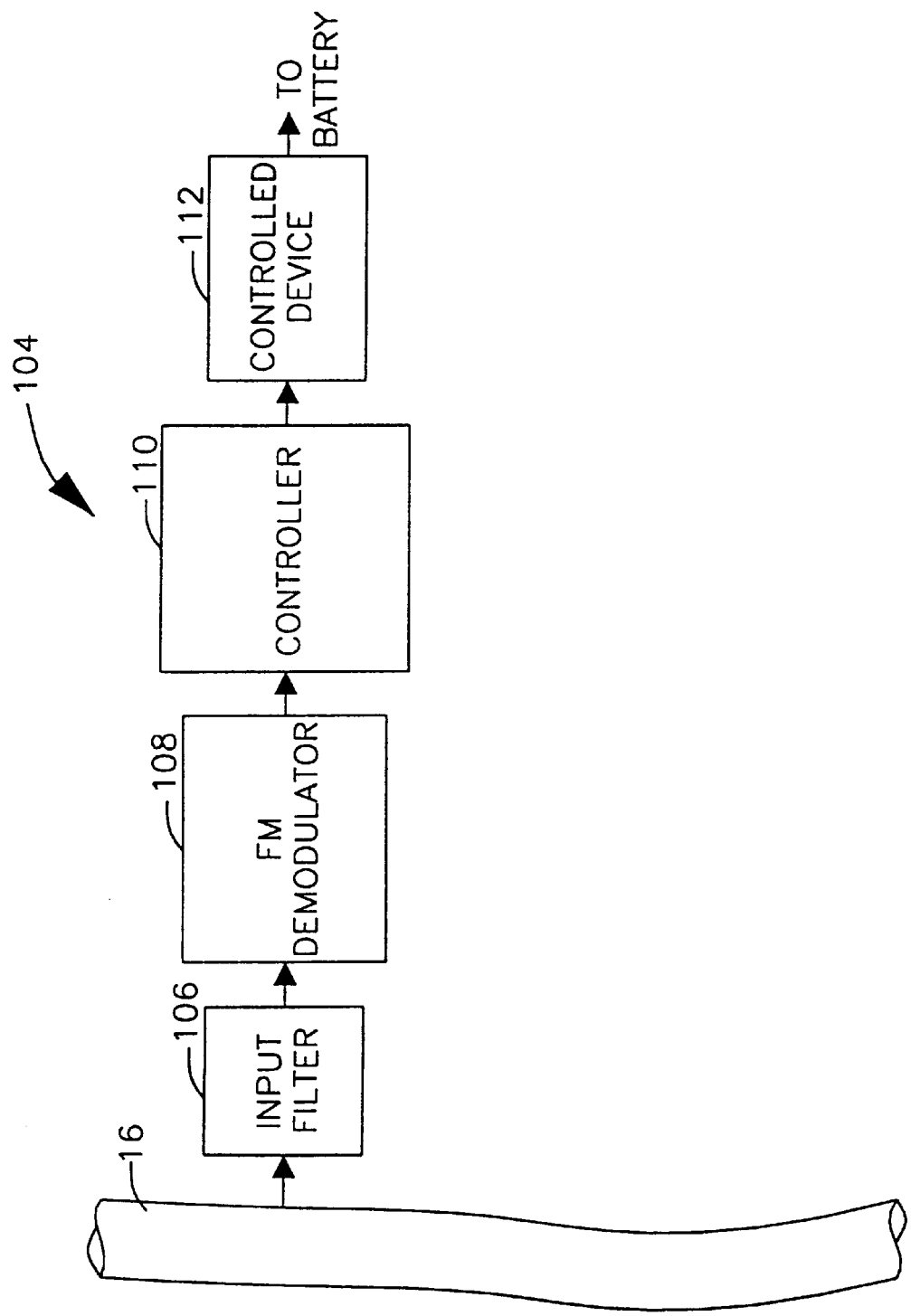
FIG. 10 is a schematic diagram of an one-way receiving battery control module.

FIG. 9 illustrates a one-way transmitting BCM 90 comprising monitoring elements 92 and 94, an analog multiplexer 96, a controller 98, voltage to frequency convertor 100, and FM transmitter 102 connected to the main conductor 16. FIG. 10 illustrates a one-way receiving BCM 104 comprising an input filter 106, a FM demodulator 108, a controller 110, and a controlled device 112.

Figure 3:
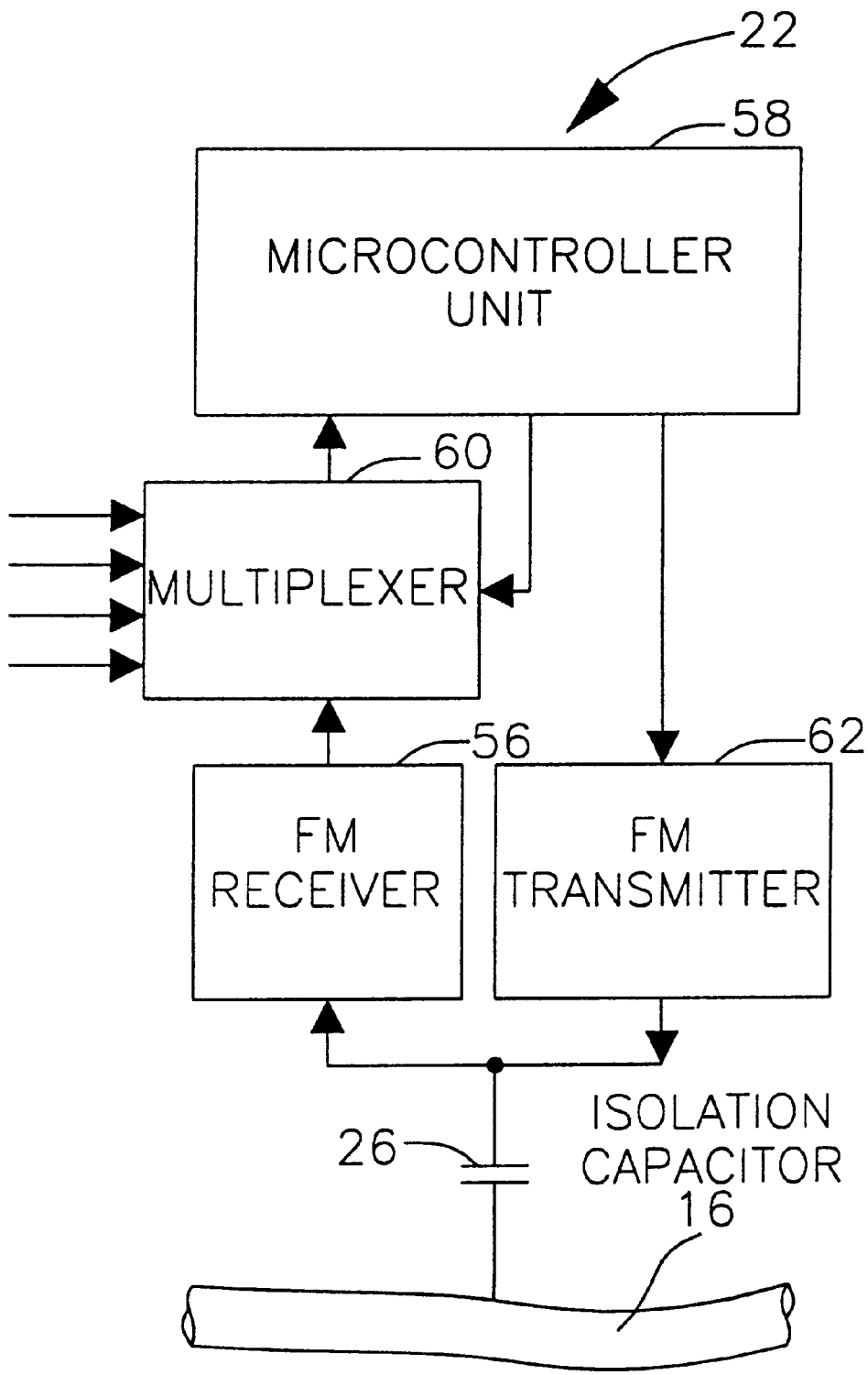
FIG. 3 is a schematic diagram of a control unit illustrated in FIG. 1.

Referring now to FIG. 3, in one EMS embodiment, the EMS control unit 22 includes an RF receiver 56 having an input connected to the main conductor 16, via the optional in-line capacitor 26, as shown in FIG. 1. The RF receiver 56 is a broadband receiver configured to receive the broadband radio frequency signal transmitted by the RF transmitters of each of the BCMs. In one embodiment, the RF receiver 56 is configured to receive a broadband radio frequency signal of approximately 5.5 megahertz. However, it is understood that the EMS of the invention is intended to be used with radio frequency signals in the frequency range of from about 1 KHz to 1 GHz. The RF receiver 56 also demodulates the received radio frequency signal into a digital voltage signal, for example, in one embodiment from zero to five volts DC.

Output from the RF receiver 56 may either be connected directly to a microcontroller unit 58, or may alternatively be connected to the microcontroller unit 58 via a digital multiplexer 60 or other digital switch. The multiplexer 60 is operated by the microcontroller unit 58 to select from one of a number of different input signals to be processed by the microprocessor unit. In one embodiment, a multiplexer 60 is used to select between an output signal from the RF receiver 56 and input signals from other electrical devices within the vehicle, e.g., input signals from the motor controller to provide voltage, current, temperature, and charging status information.

The microcontroller unit 58 is configured to operate off of available power, such as 12 volts DC when used in an electric vehicle, and includes a microprocessor board (not shown). Alternatively, the microcontroller unit 58 can operate from an internal source of power, from vehicle power external from the battery pack, from solar power and the like. The microprocessor board is configured to accommodate a number of different input signals that include the digital voltage signal output from the RF receiver 56. The microprocessor board is programmed to receive the signal output from the RF receiver 56, and additionally store the received information in a SRAM or EEPROM. The control unit 22 is adapted to accommodate a connection with a user interface to facilitate programming the microprocessor board and to gain access to information stored in the microprocessor SRAM. Information stored in the microcontroller unit 58 can be retrieved at a later time for purposes of diagnostic evaluation and the like. Such stored information includes the performance history of each battery in a battery pack, or each battery cell of batteries in a battery pack, over the service life of the battery or battery pack, or within the servicing interval of the same. In certain embodiments of the invention, such battery performance history is retrieved by the off-board control unit 33 during vehicle maintenance or battery pack servicing to provide important information that may indicate the mechanism or reason for a particular battery-related failure. The ability to retrieve stored battery operating parameter and/or performance information is important, e.g., for purposes of determining whether a battery has been maintained, serviced, or used properly for battery warranty verification.

The signal output received from the RF receiver 56, e.g., battery operating parameter information transmitted by each BCM, is evaluated by the microprocessor according to one or more control system programs. In various embodiments, the microprocessor uses control, pattern recognition, artificial intelligence, fuzzy logic, neural network, or other analysis and control techniques to interpret the information received from each of the BCMs and/or generate a control response. Once the received information is evaluated, the microprocessor effects one or more process steps that include generating one or more particular commands.

In a preferred embodiment, the microprocessor unit 58 generates one or more of the 11 commands discussed above. Each command is configured in the form of a serial digital control signal comprising series of zero or five volt bits. Each command string is accompanied by one or more address, configured as an additional series digital signal that corresponds with one or more address of a particular BCM. In this manner the control unit 22 is able to transmit control signals to one or more particular BCMs. Although a particular method of tagging or addressing the command string to one or more designated BCMs has been specifically disclosed, it is to be understood that other techniques of tagging or addressing the command string can be used, such as by analog tagging techniques, other digital tagging techniques, or by using multiple channels of radio frequency signals.

The output signal from the microcontroller unit 58, e.g., the addressed command pulse signal, is routed to an RF transmitter 62. The RF transmitter 62 is preferably a broadband transmitter similar to the RF transmitters in each BCM. The RF transmitter 62 takes the serial digital signal and transmits a broadband radio frequency signal of approximately 4.5 megahertz, depending on whether a signal of one or zero is received, respectively. An output from the RF transmitter 62 is connected to the main conductor 16 via the in-line capacitor 26. Alternatively, rather than being connected in parallel to the isolation capacitor 26, the FM transmitter 62 and FM receiver 56 can be connected independently to the main conductor 16 via separate connections using separate isolation capacitors.

The control unit 22, and more specifically the microprocessor unit 58, serves as a communication interface to not only provide a control signal to each of the two-way or one-way receiving BCMs, but to perform other functions such as: (1) monitoring a current state of charge for the battery pack and transmitting the same to a fuel gauge indicator; (2) controlling the operation of a ventilation fan in a battery compartment of the vehicle; (3) controlling the operation of auxiliary electrical devices, e.g., passenger compartment heating and cooling functions, to reduce the power routed to such devices or load shed when conditions call for battery conservation; (4) activating a maintenance warning light to indicate when one or more battery or battery cells within a battery pack need replacement or servicing; (5) operating the on-board battery charger and/or providing battery voltage information to the on-board battery charger.

In certain applications it is desirable that the EMS be capable of identifying BCM and/or battery location within a battery pack. One method of determining BCM location is by radio frequency signal, e.g., by sending out a radio frequency signal from the control unit and evaluating a response radio frequency signal sent by one or more BCMs to determine their relative position in the battery pack. This can be done, for example, by sending a sine wave by radio frequency to one or more BCMs and measuring the phase shift of the response sine waves sent by the BCMs.

Figure 11:
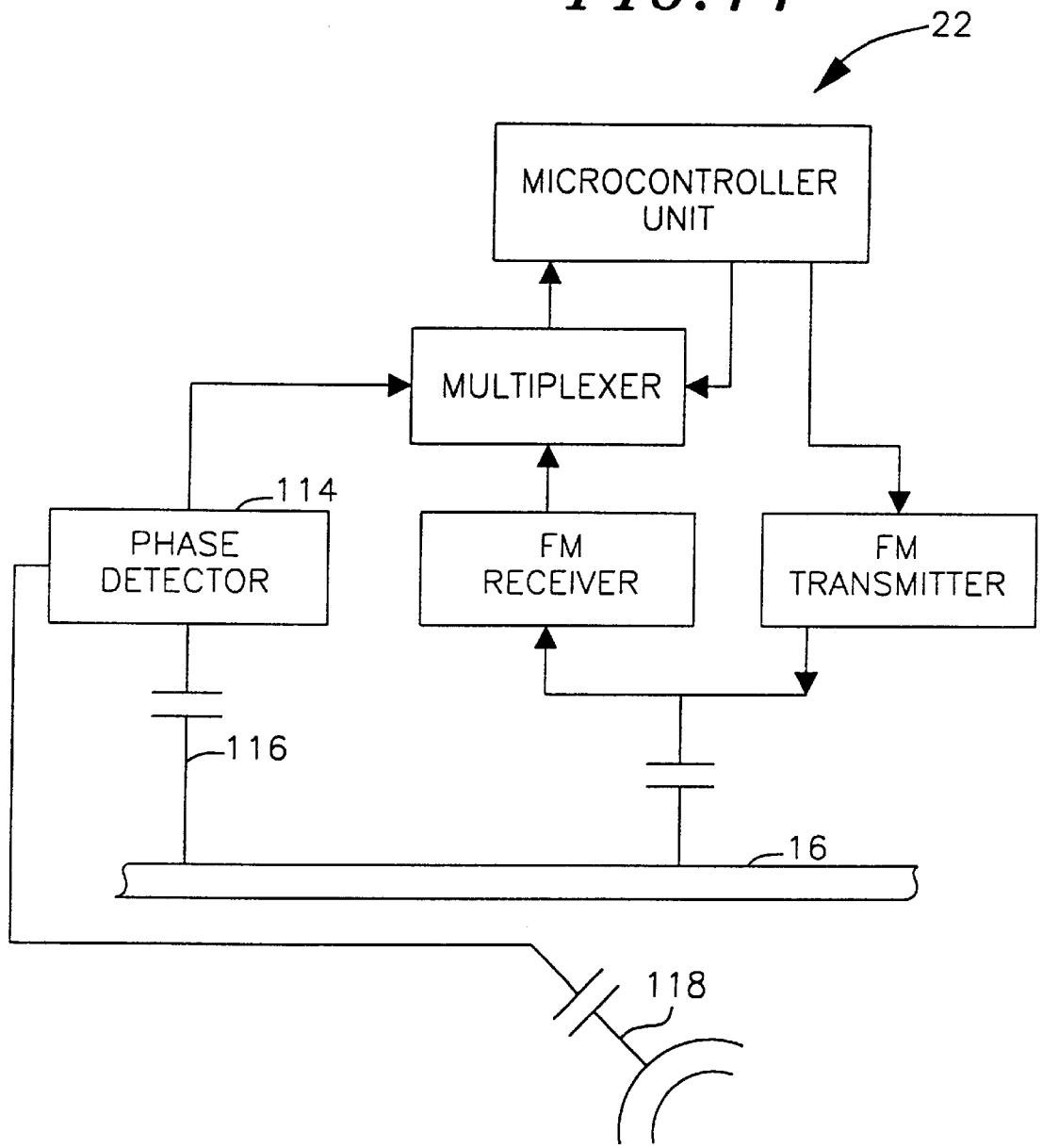
FIG. 11 is a schematic diagram of a control unit comprising a phase detector.
Figure 12:
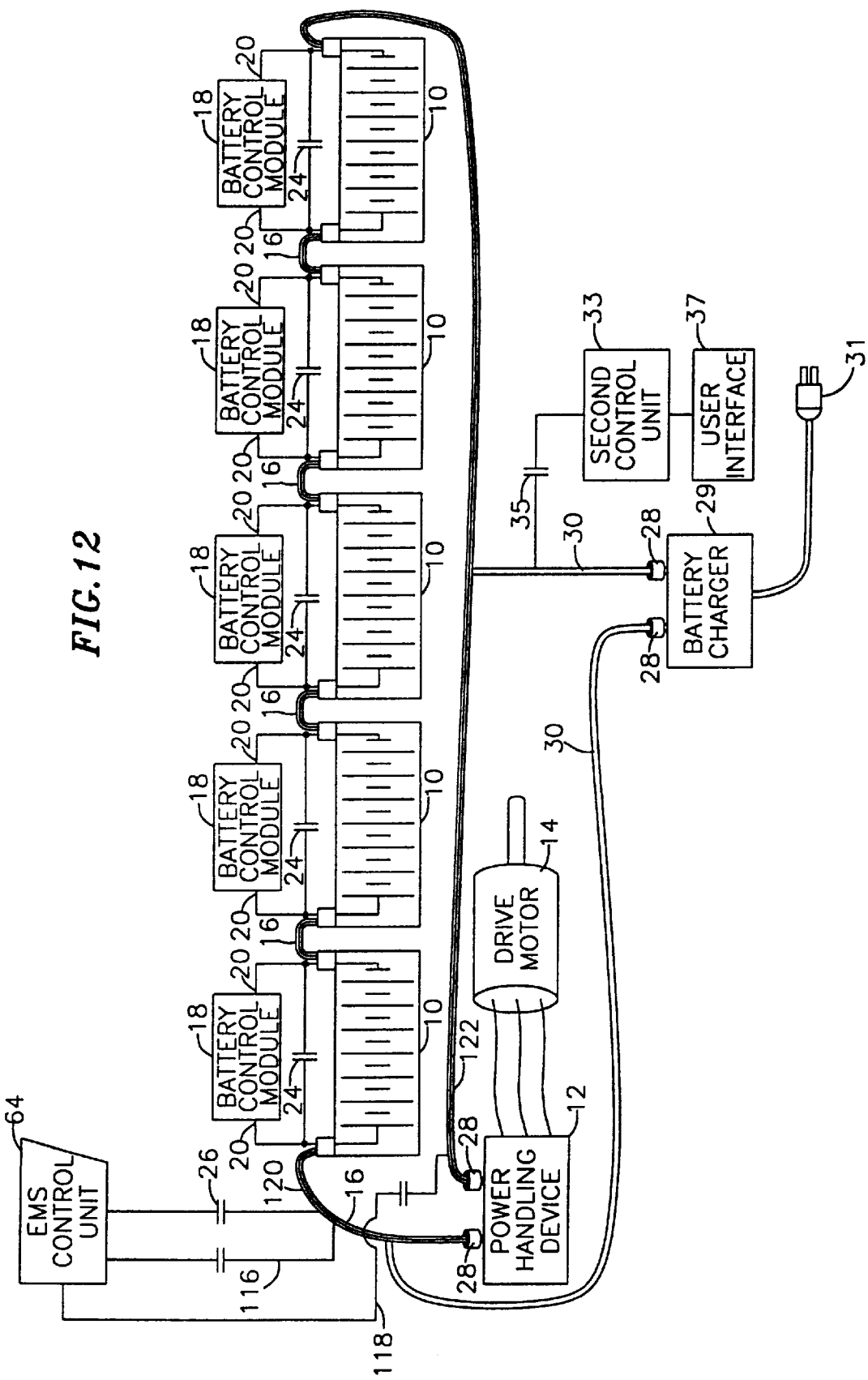
FIG. 12 is a schematic diagram of an energy management system comprising the control unit of FIG. 11.

Referring to FIG. 11, in another BCM locating embodiment, a control unit 22 adapted for such function includes a phase detector 114 that is connected to the main conductor 16 via two connections 116 and 118 at connection points, e.g., the high and low sides of the battery pack. Referring to FIG. 12, the high-side connection point 116 is at main conductor section 120, and the low-side connection point 118 is at main conductor section 122. The phase detector is configured to monitor the communication signals sent between the control unit and the BCMs to detect the relative phase of transmissions from two-way or one-way transmitting BCMs for purposes of evaluating a phase difference related to the position of each BCM in a battery pack to ascertain BCM location within the battery pack. Although the phase detector has been illustrated as having two main conductor connection points or antenna that are independent of the connection point for the control unit FM receiver and transmitter, it is to be understood that one phase detector connection point, e.g., the high-side connection point, can be shared with the FM receiver and transmitter. Additionally, the phase detector can share one connection point with a control unit comprising an FM receiver and transmitter that each has its own connection point. For such shared connection point embodiments the phase detector must still have a separate connection at two different points of the battery pack.

Figure 14A:
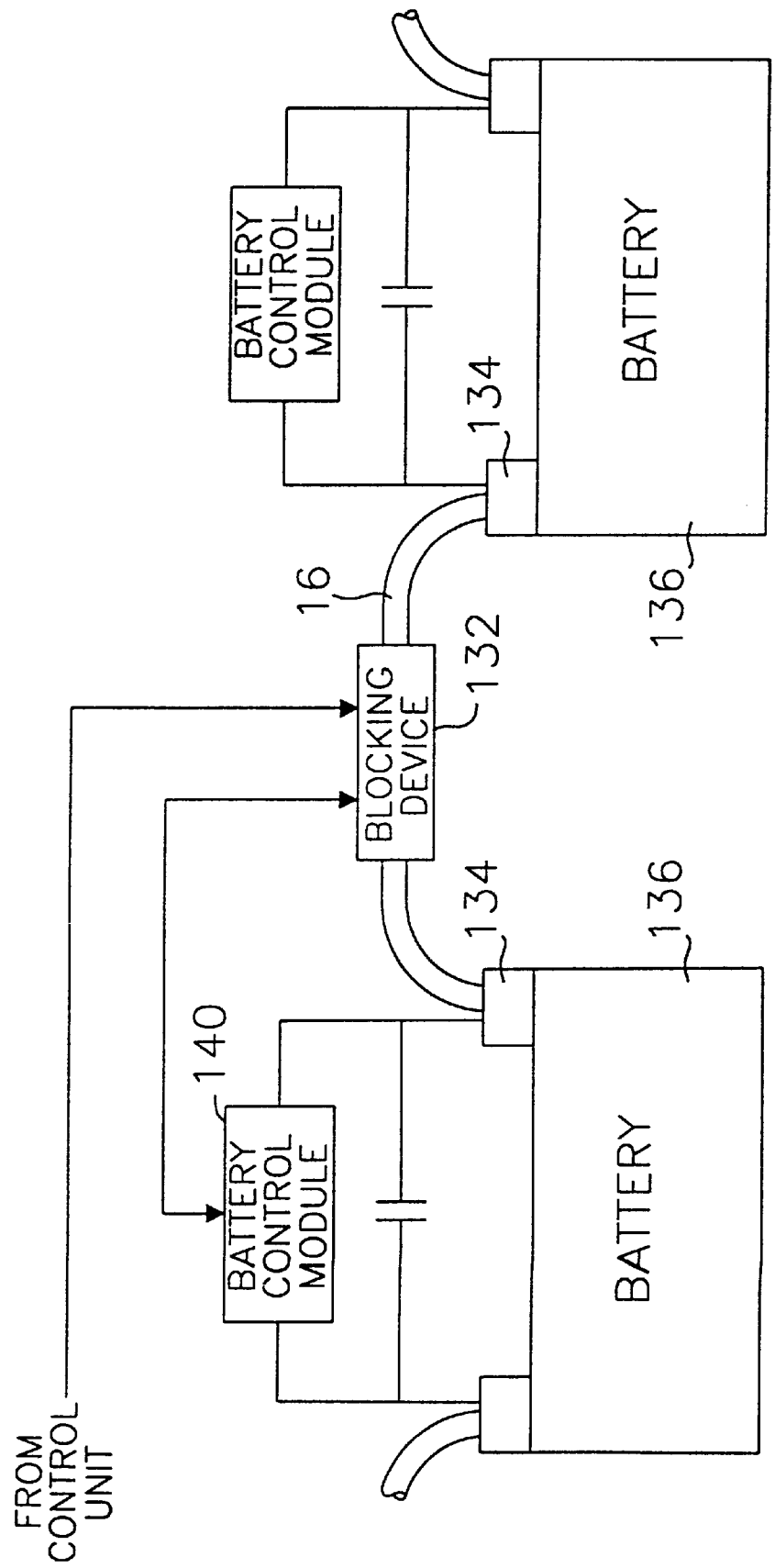
FIGS. 14A and 14B are schematic diagrams of energy management system signal blocking devices that can be used to identify the location of the battery control modules and/or batteries in the system.
Figure 14B:
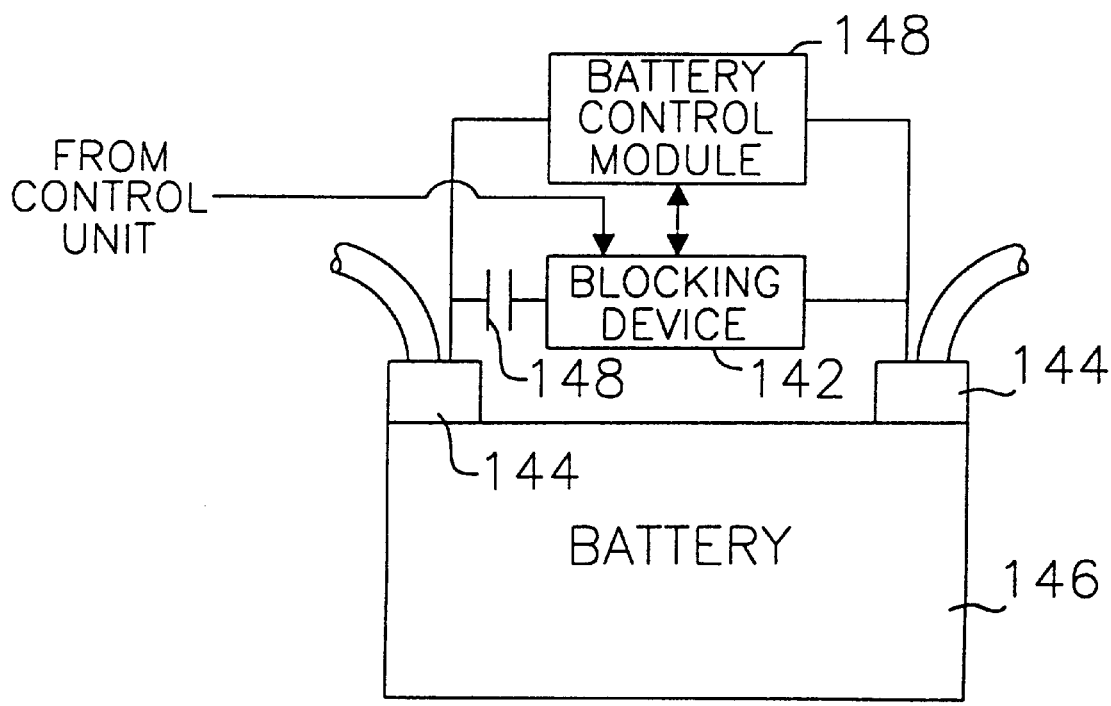

Another method of locating BCMs in an EMS comprises the use of a signal blocking device that can be controlled either by a respective BCM or by the control unit. The signal blocking device can be controlled to prevent the passage of a radio frequency signal from the control unit beyond a particular BCM and respective battery. Once the blocking device is activated, the control unit and/or BCM can be operated to produce a desired locating signal according to control algorithm to ascertain BCM location identification. Referring to FIG. 14A, in one embodiment, a signal blocking device 132 is interposed in series between the main conductor 16 that connects the battery terminals 134 of adjacent batteries 136. The blocking device 132 can be controlled by the respective BCM 140, i.e., be a control device of the BCM, and/or the control unit to prevent the passage of radio frequency signals thereby, thus isolating the downstream BCMs and batteries in the battery pack to enable subsequent BCM location identification. Referring to FIG. 14B, in another embodiment, a signal blocking device 142 is interposed in parallel between the terminals 144 of a battery 146, and in series with a capacitor interposed across the battery terminals. The blocking device 142 can be controlled by the respective BCM 148 and/or the control unit to prevent the passage of radio frequency signals thereby, thus isolating the downstream BCMs and batteries in the battery pack to enable subsequent BCM location identification.

FIGS. 14A and 14B illustrate a single blocking device attached between two batteries for the series embodiment, and attached to a single battery for the parallel embodiment for purposes of clarity and illustration. It is to be understood that the EMS system comprising such BCM locating devices can include one or more of these blocking devices within the battery pack. For example, in one embodiment it may be desired that a signal blocking device be attached between every battery for the series embodiment, or be attached between the terminals of each battery in the parallel arrangement. However, in some applications it may be desired that signal blocking devices not be placed between every battery in the series arrangement, or between the battery terminals of every battery to enable BCM location identification. The arrangement of signal blocking devices is understood to vary depending on particular EMS embodiment and application.

Figure 13:
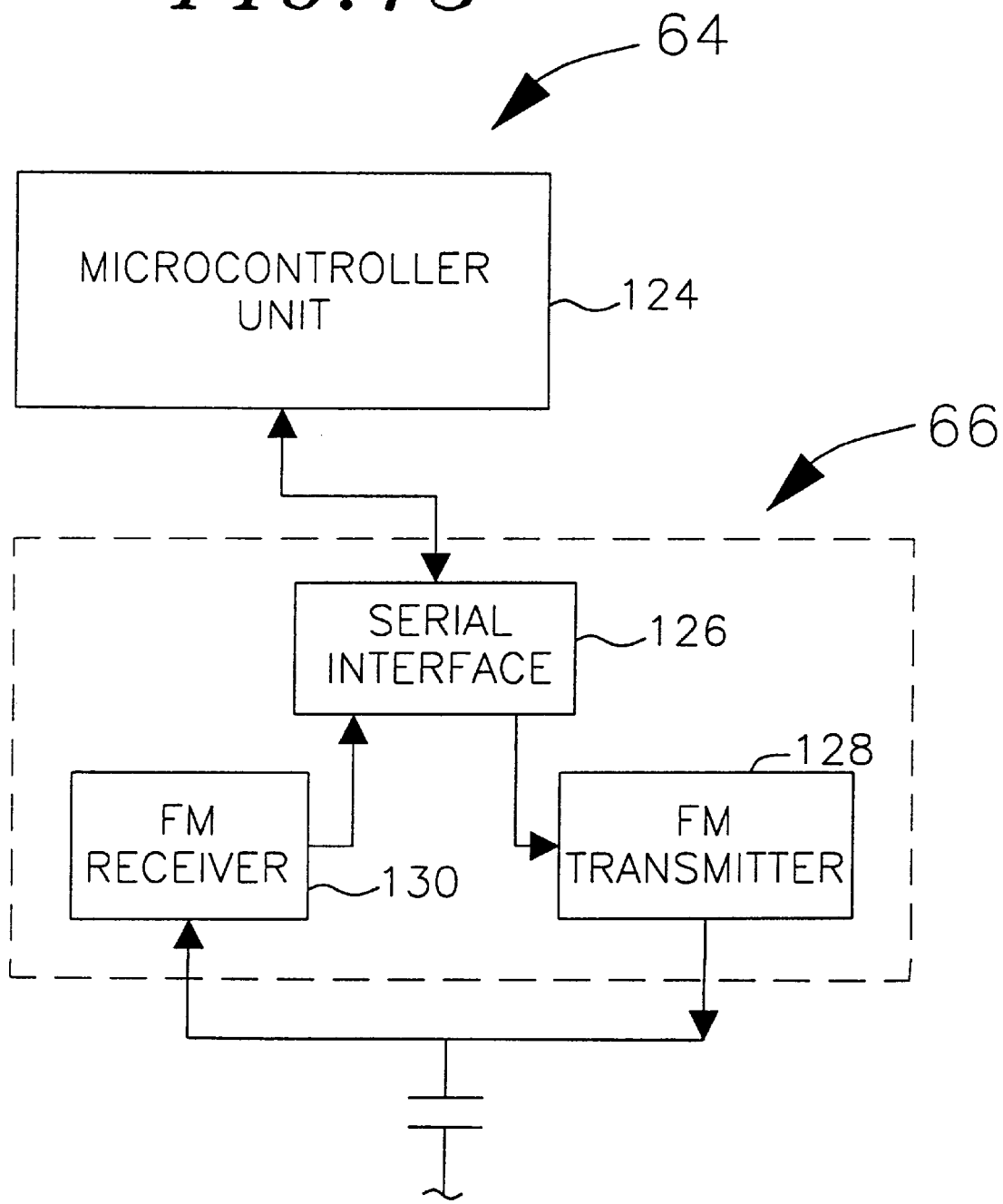
FIG. 13 is a schematic diagram of the separate control unit and serial interface of FIG. 4.

Referring to FIG. 4, an alternative EMS embodiment comprises a control unit 64 and a separate interface device 66 interposed between the control unit and the optional capacitor 26. Referring to FIG. 13, the control unit 64 is constructed comprising a microcontroller unit 124 as described above. The separate interface device 66 comprises a serial interface 126, an FM transmitter 128, and an FM receiver 130. Unlike FIG. 3, FIG. 13 does not show a separate multiplexer to illustrate that the multiplexer can be part of the microcontroller unit 124. An EMS embodiment configured in this manner, comprising a separate control unit and interface device, is used to allow access to the control unit or BCMs using outside on-board or off-board systems.

In a preferred embodiment, an EMS constructed according to principles of this invention operates to monitor the performance of individual batteries in a battery pack, or individual battery cells in batteries making up a battery pack, to achieve battery charge equalization and/or battery thermal management. Battery charge equalization refers to controlling the state of charge of each battery in a battery pack so that each individual battery is charged to the same degree as other batteries in the pack. For example, if one battery in a battery pack is relatively weaker than the remaining batteries, the weak battery will be selectively charged for a longer period or more frequently than the other batteries so that it does not have the effect of weakening the overall performance of the pack. As another example, if one battery in a battery pack is relatively stronger than the remaining batteries, the strong battery will be selectively discharged so that it does not have the effect of reducing the charging time or frequency for the remaining batteries. Battery charge equalization, therefore, improves battery pack service life because each battery in the battery pack is monitored and controlled individually to perform equally.

EMSs constructed according to this invention have several advantages when compared to existing wired-type systems. One advantage is the reduced material cost of the EMS system due to the elimination of extra wires, wiring harnesses, and installation associated with such wires. Another advantage is that the use of the EMS eliminates the need for some high-voltage isolation components, needed to monitor and control signals with widely differing base voltages. Another advantage is the weight savings realized by the EMS due to the elimination of extra wires, wiring harnesses, and high-voltage isolation components. Another advantage is that the EMS is safe to install because it does not include any components or modules that are connected with voltages greater than 12 volts DC. Another advantage is that the EMS is more reliable and has a potentially longer service life than wired-type systems because it lacks the most vulnerable element of those systems; namely, exposed signal wires near the battery.

Still another advantage of EMSs of this invention is the modular design of components, which allows for extremely flexible and robust system operation. For example, single failures in one BCM or an open circuit in a battery do not disable the entire system because other BCMs are still able to transmit information and receive control signals from the control unit via radio frequency transmission. The modular construction also facilitates easy removal of an improperly operating or nonfunctioning BCM from the system as well as replacement with a repaired, new or upgraded BCM. Further, modular construction facilitates the introduction of additional BCMs or other system modules into the system by simply reprogramming or instructing the control unit.

The modular construction of the EMS allows for the installation of system components inside of existing electrical system components, e.g., the installation of a BCM within a battery housing, thereby allowing them to be made by the manufacturers of such electrical system components. For example, the control unit can be manufactured into the motor controller or into an on-board battery charger. Incorporating the EMS components into existing electrical system components is advantageous because it could further reduce the cost of the EMS, increase the reliability of the EMS, reduce the space requirements for the EMS, increase EMS flexibility, and allow the EMS to cooperate directly with the motor control or battery charger.

Although a specific embodiment of the EMS has been described and illustrated herein, many modifications and variations will be apparent to those skilled in the art. For example, an EMS within the scope of this invention comprises means for facilitating the transfer of radio frequency transmissions to and from the control unit and each BCM by other than by conductive radio frequency transmission via the main conductive path, e.g., the main conductor, in an electrical system, such as by nonconductive methods, e.g., an antenna system, remote from the main conductor. As another example, the EMS can use radio frequencies other than those specifically described above for purposes of transmitting information from the BCMs and control signals from the control unit. Additionally, the information and control signals generated by the EMS can be transmitted, via radio frequency, using analog rather than digital transmission methods.

Accordingly, it is to be understood that within the scope of the appended claims the EMS according to principles of this invention may be embodied other than as specifically described herein.

What is claimed is:

1. An energy management system for use with an electrically powered apparatus, the system comprising:
   a number of battery control modules on the apparatus, wherein each battery control module includes:
   means for monitoring at least one operating parameter of an electric power source for the apparatus selected from the group consisting of a battery pack, at least one battery in a battery pack, at least one cell in a battery, and combinations thereof; and
   at least one device selected from the group consisting of a radio frequency signal receiving means, a radio frequency transmitting means, a location indicating device, a memory device, a control device, a controller, and combinations thereof; and
   a control unit on the apparatus configured to communicate with the battery control modules by radio frequency signal, wherein the control unit includes at least one device selected from the group consisting of a radio frequency signal receiving device, a radio frequency signal transmitting device, a controller, and combinations thereof;
   wherein the battery control modules and the control unit are connected to a common conductive transmission medium used to connect an electric power source to a power handling device in the electrically powered apparatus to facilitate radio frequency communication.

2. An energy management system as recited in claim 1 further comprising an interface device connected to the main conductor to facilitating accessing the battery control modules independently of the control unit by other energy management system device.

3. An energy management system as recited in claim 1 wherein each battery control module comprises a radio frequency receiver and a radio frequency transmitter to provide two-way radio frequency communication with at least one of other battery control modules or with the control unit.

4. An energy management system as recited in claim 1 wherein the battery control module control device is selected from the group consisting of an audible indicating device, a visual indicating device, a power source shunt device, a signal blocking device, and combinations thereof.

5. An energy management system as recited in claim 4 wherein the power source shunt device comprises at least one element selected from the group consisting of resistors, thermoelectric devices, and combinations thereof.

6. An energy management system as recited in claim 5 wherein the power source shunt device includes a thermal connection to a heat sink formed from a conductive element of a respective battery.

7. An energy management system as recited in claim 1 further comprising a power source charger located on-board the electrically-powered apparatus, wherein the power source charger is connected to the main conductor, wherein the power source charger is connected to the control unit to perform at least one function selected from the group consisting of receiving control signals from the control unit, retrieving power source operating parameter information from the control unit, retrieving power source operating parameter information from the battery control module, and combinations thereof.

8. An energy management system as recited in claim 1 further comprising a user interface connected to one of the main conductor or control unit for performing at least one function selected from the group consisting of receiving control signals from the control unit, retrieving power source operating parameter information from the control unit, retrieving power source operating parameter information from the battery control module, providing programming information to the control unit, providing programming information to at least one battery control module, and combinations thereof.

9. An energy management system as recited in claim 1 further comprising a battery control module locating device connected to the main conductor for determining the location of at least one battery control module in the energy management system by radio frequency signal.

10. An energy management system as recited in claim 1 wherein the battery control modules are configured to take simultaneous power source voltage readings for subsequent retrieval.

11. An energy management system for use with an electrically powered apparatus, the system comprising:
  a number of battery control modules on the apparatus, wherein each battery control module includes:
    means for monitoring at least one operating parameter of an electric power source for the apparatus selected from the group consisting of a battery pack, at least one battery in a battery pack, at least one cell in a battery, and combinations thereof; and
    at least one device selected from the group consisting of a radio frequency signal receiving device, a radio frequency transmitting device, a memory device, a control device, a controller, and combinations thereof; and
    wherein radio frequency receiving and transmitting means for said battery control modules are connected to a common conductive transmission medium, used to connect an electric power source to a power handling device in the electrically powered apparatus, to facilitate radio frequency communication between the battery control modules.

12. An energy management system as recited in claim 11 wherein each battery control module comprises a radio frequency receiver and a radio frequency transmitter to provide two-way radio frequency communication with other battery control modules.

13. An energy management system as recited in claim 11 wherein each battery control module comprises a memory device to store power source operating parameter information therein for subsequent retrieval.

14. An energy management system as recited in claim 13 wherein each battery control module is configured to effect simultaneous voltage monitoring of respective power sources for subsequent retrieval.

15. An energy management system as recited in claim 11 wherein the battery control module control device is selected from the group consisting of an audible indicating device, a visual indicating device, a power source shunt device, a radio frequency signal blocking device, and combinations thereof.

16. An energy management system as recited in claim 15 wherein the power source shunt device is used to shunt current from an electric power source selected from the group consisting of a battery, a battery cell, and combinations thereon, wherein the power source shunt device comprises at least one element selected from the group consisting of resistors, thermoelectric devices, and combinations thereof.

17. An energy management system as recited in claim 16 wherein the power source shunt device includes a thermal connection to a heat sink formed from a conductive element of a respective battery.

18. An energy management system as recited in claim 11 further comprising a control unit comprising at least one of a radio frequency transmitter and a radio frequency receiver that are connected to the main conductor to facilitate radio frequency communication with said battery control modules.

19. An energy management system as recited in claim 18 further comprising an interface device connected to the main conductor to facilitate accessing the battery control modules by radio frequency signal independent of the control unit.

20. An energy management system as recited in claim 18 further comprising a battery control locating device connected to the main conductor to identify relative battery control module location in the energy management system by radio frequency signal.

21. An energy management system for use with an electric vehicle having a battery source of motive power, the system comprising:
  a number of battery control modules, wherein each battery control module includes:
    at least one monitoring element located on the vehicle and configured to measure an operating parameter of an electric power source selected from the group consisting of a battery pack, at least one battery in a battery pack, at least one cell in a battery, and combinations thereof;
    at least one other device selected from the group consisting of a radio frequency receiver, a radio frequency transmitter, a memory device, control devices, a controller, and combinations thereof; and
  a control unit located on the vehicle and configured to communicate with the battery control modules by radio frequency signal, wherein the control unit includes a radio frequency receiver and a radio frequency transmitter;
    wherein the control unit and battery control modules are connected to a common conductive path attached between the electric power source and a power handling device in the vehicle to facilitate radio frequency communication therebetween.

22. An energy management system as recited in claim 21 further comprising an interface device connected to the main conductor to facilitating accessing the battery control modules by radio frequency signal independently of the control unit by other device.

23. An energy management system as recited in claim 21 wherein each battery control module comprises at least one power source control device, a radio frequency receiver, and a radio frequency transmitter to provide two-way radio frequency communication with at least one of other battery control modules or with the control unit.

24. An energy management system as recited in claim 23 wherein the battery control module power source control device is selected from the group consisting of audible indicating devices, visual indicating devices, power source shunt devices, radio frequency signal blocking devices, and combinations thereof.

25. An energy management system as recited in claim 24 wherein the power source shunt device comprises at least one element selected from the group consisting of resistors, thermoelectric devices, and combinations thereof.

26. An energy management system as recited in claim 21 further comprising a power source charger located on-board the electrically-powered apparatus, wherein the power source charger is connected to the main conductor, wherein the power source charger is connected to the control unit to perform at least one function selected from the group consisting of receiving control signals from the control unit, retrieving power source operating parameter information from the control unit, retrieving power source operating parameter information from the battery control module, and combinations thereof.

27. An energy management system as recited in claim 21 further comprising a battery control module locating device connected to the main conductor for determining the relative location of a battery control module in the energy management system by radio frequency signal.

28. An energy management system as recited in claim 21 further comprising a user interface connected to one of the main conductor or control unit for performing at least one function selected from the group consisting of receiving control signals from the control unit, retrieving power source operating parameter information from the control unit, retrieving power source operating parameter information from the battery control module, providing programming information to the control unit, providing programming information to at least one battery control module, and combinations thereof.

29. An energy management system for use with an electric vehicle having a battery source of motive power, the energy management system comprising:

a number of battery control modules located on the vehicle, wherein each battery control module includes at least one monitoring element for measuring an operating parameter of a respective battery or a battery cell, a radio frequency transmitting device, a radio frequency receiving device and at least one or more device selected from the group consisting of a memory device, a control device, and a controller; and a control unit located on the electric powered apparatus for communicating with the battery control modules by radio frequency signal, wherein the control unit includes a radio frequency receiver, a controller for evaluating radio frequency signals transmitted from said battery control module and providing a control signal, a radio frequency transmitter for transmitting radio frequency control signal to said battery control module;

wherein the control unit and each battery control module is connected to a common main conductive path, in an electrical system of the vehicle running between batteries in a battery pack and connecting the battery pack to a power handling device in the vehicle, to facilitate radio frequency communication therebetween.

30. An energy management system as recited in claim 29 further comprising an interface device separate from the control unit that is connected to the main conductive path to facilitate accessing the battery control modules by radio frequency signal independent of the control unit.

31. An energy management system as recited in claim 30 further comprising a battery control module locating device connected to the main conductive path for determining the location of one or more battery control module within the energy management system by radio frequency.

32. An energy management system as recited in claim 29 wherein the control device is at least one device selected from the group consisting of audible indicating devices, visual indicating devices, power source shunt devices, radio frequency signal blocking devices, and combinations thereof.

33. An energy management system as recited in claim 32 wherein the power source shunt device is attached across a power source and includes at least one element selected from the group consisting of resistors, thermoelectric devices, and combinations thereof.

34. An energy management system as recited in claim 29 further comprising a power source charger located on-board the electrically-powered apparatus, wherein the power source charger is connected to the main conductive path, wherein the power source charger is connected to the control unit to perform at least one function selected from the group consisting of receiving control signals from the control unit, retrieving power source operating parameter information from the control unit, retrieving power source operating parameter information from the battery control module, and combinations thereof.

* * * * *